(12) United States Patent
Han et al.

(10) Patent No.: US 9,891,665 B2
(45) Date of Patent: Feb. 13, 2018

(54) WEARABLE SMART DEVICE

(71) Applicant: LG ELECTRONICS INC., Seoul (KR)

(72) Inventors: Jongbeom Han, Seoul (KR); Sanghyuk Im, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/158,316

(22) Filed: May 18, 2016

(65) Prior Publication Data

US 2016/0342176 A1   Nov. 24, 2016

Related U.S. Application Data

(60) Provisional application No. 62/165,199, filed on May 22, 2015.

(30) Foreign Application Priority Data

Aug. 18, 2015 (KR) ........................ 10-2015-0115931

(51) Int. Cl.
*G06F 1/16* (2006.01)
*G04G 21/00* (2010.01)
(Continued)

(52) U.S. Cl.
CPC ............ *G06F 1/163* (2013.01); *A44C 5/2052* (2013.01); *G04B 37/1486* (2013.01);
(Continued)

(58) Field of Classification Search
CPC ........ G06F 1/183; G04G 17/00; G04G 17/04; G04G 17/08; G04G 17/083; G04B 37/1486; G04B 37/16
See application file for complete search history.

(56) References Cited

U.S. PATENT DOCUMENTS 5,008,864 A * 4/1991 Yoshitake ............ G04B 47/025
368/10
5,235,560 A * 8/1993 Seager ................. A44C 5/0007
224/164

(Continued)

FOREIGN PATENT DOCUMENTS

KR   10-2014-0126027 A   10/2014

*Primary Examiner* — Adrian S Wilson
(74) *Attorney, Agent, or Firm* — Birch, Stewart, Kolasch & Birch, LLP

(57) ABSTRACT

A wearable smart device have a display, a body configured to support the display by having a prescribed curvature to be worn on a user body of a user, a band configured to be detachably coupled with the body by having a prescribed curvature, a first connector configured to couple a first end portion of the band to the body, the first connector configured to separate the first end portion of the band from the body, and a second connector configured to couple a second end portion of the band opposing the first end portion to the body, the second connector configured to separate the second end portion of the band opposing the first end portion from the body. A first direction for separating the band from the body in the first connector is different from a second direction for separating the band from the body in the second connector.

19 Claims, 13 Drawing Sheets

(51) Int. Cl.
*G04G 17/04* (2006.01)
*G04G 17/06* (2006.01)
*G04B 37/14* (2006.01)
*G06K 9/00* (2006.01)
*A44C 5/20* (2006.01)
*A44C 5/14* (2006.01)
*A44C 5/12* (2006.01)

(52) U.S. Cl.
CPC ........... *G04G 17/045* (2013.01); *G04G 17/06* (2013.01); *G04G 21/00* (2013.01); *G06F 1/1635* (2013.01); *G06F 1/1637* (2013.01); *G06F 1/1679* (2013.01); *G06K 9/00013* (2013.01); *A44C 5/12* (2013.01); *A44C 5/14* (2013.01); *A44C 5/2071* (2013.01)

(56) References Cited

U.S. PATENT DOCUMENTS

| | | | | |
|---|---|---|---|---|
| 5,889,737 | A | 3/1999 | Alameh et al. | |
| 6,459,890 | B1* | 10/2002 | Kim | G04G 17/00 368/204 |
| 6,854,978 | B2* | 2/2005 | Noirjean | H01Q 1/273 343/718 |
| 6,978,160 | B2* | 12/2005 | Hutchison | H04B 1/385 455/573 |
| 7,618,260 | B2* | 11/2009 | Daniel | A44C 5/0007 24/311 |
| 8,787,006 | B2* | 7/2014 | Golko | G06F 1/163 361/679.03 |
| 8,787,119 | B2* | 7/2014 | Sorias | G04C 10/00 368/204 |
| 9,155,505 | B2* | 10/2015 | Caduff | A61B 5/01 |
| 9,256,253 | B2* | 2/2016 | Peek | G02B 6/42 |
| 9,367,087 | B1* | 6/2016 | Townsend | G06F 1/163 |
| 2007/0064542 | A1 | 3/2007 | Fukushima | |
| 2013/0108907 | A1 | 5/2013 | Bhardwaj et al. | |
| 2013/0171490 | A1 | 7/2013 | Rothkopf et al. | |
| 2014/0160078 | A1 | 6/2014 | Seo et al. | |
| 2014/0218852 | A1 | 8/2014 | Alcazar | |
| 2014/0295918 | A1 | 10/2014 | Grifoni et al. | |
| 2014/0313863 | A1 | 10/2014 | Lee et al. | |
| 2015/0116125 | A1* | 4/2015 | Armstrong | A61B 5/0456 340/870.01 |
| 2015/0120020 | A1 | 4/2015 | Armstrong | |
| 2016/0088880 | A1* | 3/2016 | Tulloch | H01R 31/06 439/37 |

* cited by examiner

WEARABLE SMART DEVICE

Pursuant to 35 U.S.C. § 119(a) and § 119(e), this application claims the benefit of earlier filing date and right of priority to Provisional Application No. 62/165,199 filed on May 22, 2015, and Korean Patent Application No. 10-2015-0115931 filed on Aug. 18, 2015, the contents of which are hereby incorporated by reference herein in their entireties.

BACKGROUND OF THE INVENTION

Field of the Invention

The present invention relates to a smart device, and more particularly, to a wearable smart device wearable on a user's body.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some terminals include additional functionality which supports electronic game playing, while other terminals are configured as multimedia players. More recently, mobile terminals have been configured to receive broadcast and multicast signals which permit viewing of contents such as videos and television programs. In order to run such functions, a mobile terminal is basically connected to other devices or network using various communication protocols and can provide a user with ubiquitous computing. In particular, a mobile terminal has been evolved into a smart device that enables the connectivity to networks and the ubiquitous computing.

Thus, a smart device as a mobile terminal has been manufactured in a traditional size for a user to hold the smart device with a hand, whereby the user carries the smart device in a manner of holding the smart device with his hand or putting the smart device in a bag or pocket. Recently, owing to the technological developments, a smart device tends to be manufactured in further smaller size and is developed into a wearable smart device directly worn on a user's body.

The wearable smart device has been developed in wearable small size to be equipped with a variety of improved functions as a mobile terminal. On the other hand, the wearable smart device has been designed in a traditional accessory shape such as a ring, a bracelet (bangle), necklace, or the like to be wearable on a user's body. Therefore, users tend to demand wearable smart devices to have charming exteriors as accessories capable of representing their individualities. For these reasons, a wearable smart device is requested to have an improved exterior as well as various functions as a smart device. Furthermore, the wearable smart device is required to have various additional improvements to provide a user with convenience in using the wearable smart device.

SUMMARY OF THE INVENTION

Accordingly, embodiments of the present invention are directed to a wearable smart device and method for controlling the same that substantially obviate one or more problems due to limitations and disadvantages of the related art.

One object of the present invention is to provide a wearable smart device having various functions and an improved exterior.

Another object of the present invention is to provide a wearable smart device convenient to use.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a wearable smart device according to one embodiment of the present invention may include a display unit configured to display various information, a body configured to support the display unit by having a prescribed curvature to be worn on a user body of a user, a band configured to be coupled with the body detachably by having a prescribed curvature to be worn on the user body, a first connector configured to couple a first end portion of the band with the body, the first connector configured to separate the first end portion of the band from the body, and a second connector configured to couple a second end portion of the band opposing the first end portion with the body, the second connector configured to separate the second end portion of the band opposing the first end portion from the body, wherein a first direction for separating the band from the body in the first connector is configured different from a second direction for separating the band from the body in the second connector.

Preferably, the body may not be deformable and the band may be deformable to restore. And, the band may be formed of a flexible material.

Preferably, the band may be completely separable from the body. Preferably, the device may have different sizes to fit a size of a user wrist and the device may include a multitude of interchangeable bands. Preferably, the body may have a fixed inner circumference length and the band may include one of bands respectively having different inner circumference lengths.

Preferably, the body may further include a first terminal configured to supply a power to the body by being disposed adjacent to the first connector. More preferably, when the first connector separates the band from the body, the first terminal may be exposed from the body to be connected to an external power.

Preferably, the band may have a built-in battery configured to supply a power to the body and the body may include a second terminal electrically connected to the battery to be supplied with the power by being disposed adjacent to the second connector. More preferably, the battery may be disposed at a center portion of the band and the band may further include a connecting module configured to connect the battery and the second terminal to each other. And, the band may further include a communication module configured to communicate with an external device and a network by being integrally formed with the connecting module. More preferably, the battery may be connected to an external power by the first terminal in order to be charged. More preferably, when the second connector separates the band, the second terminal and the body may be electrically disconnected from the battery.

Preferably, in order for the wearable smart device to be worn on or removed from the user body, only the first connector may separate the band from the body. More preferably, when the wearable smart device is worn on or removed from the user body, the second connector may maintain a coupling between the band and the body for a supply of the power to the body by the battery. Preferably, in order to replace the band by a different band, the first connector and the second connector may separate both of the first end portion and the second end portion of the band from the body.

Preferably, when the wearable smart device is worn on a wrist of the user, the first connector and the second connector may be disposed adjacent to both lateral portions of the wrist of the user, respectively.

Preferably, the first direction may include a length direction of the body or a circumferential direction of the body. Preferably, the second direction may include a radial direction of the body or a direction vertical to a circumferential direction.

More preferably, the body may further include a fingerprint recognition module disposed over the first terminal to be exposed from the body. Moreover, a thickness sum of the first terminal and the fingerprint recognition module may be smaller than 70% of a total thickness of the body.

Preferably, the first connector may include a first latch provided to one of the band and the body, the first latch inserted in the other one of the band and the body along either a length direction or a circumferential direction of the wearable smart device and a lock member provided to the other one of the band and the body, the lock member configured to engage with the first latch by moving in a width direction of the wearable smart device. Preferably, the second connector may include a second latch provided to one of the band and the body, the second latch inserted in the other one of the band and the body in a radial direction of the wearable smart device, the second latch configured to engage with the other one of the band and the body by moving in a width direction of the wearable smart device.

More preferably, the first terminal may be covered with a waterproof coating. More preferably, the body may include a waterproof ring inserted between the band and the body, the waterproof ring configured to enclose the second terminal to prevent water from flowing into the second terminal. Preferably, the body may further include a supplementary battery configured to supply a power to the display unit and other parts.

Preferably, the display unit may be formed from a prescribed point of the body forming a center angle 30° against a prescribed lateral portion of a wrist having the wearable smart device worn thereon to a different point of the body forming a center angle 150° against the lateral portion. Preferably, the display unit may include lateral portions adjacent to both lateral portions of a wrist of the user having the wearable smart device worn thereon and a center portion disposed between the lateral portions and a curvature radius of each of the lateral portions may be different from that of the center portion. More preferably, the curvature radius of the center portion may be greater than that of each of the lateral portions.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The present application will become more fully understood from the detailed description given herein below and the accompanying drawings, which are given by illustration only, and thus are not limitative of the present application, and wherein.

DETAILED DESCRIPTION OF THE INVENTION

Figure 1:
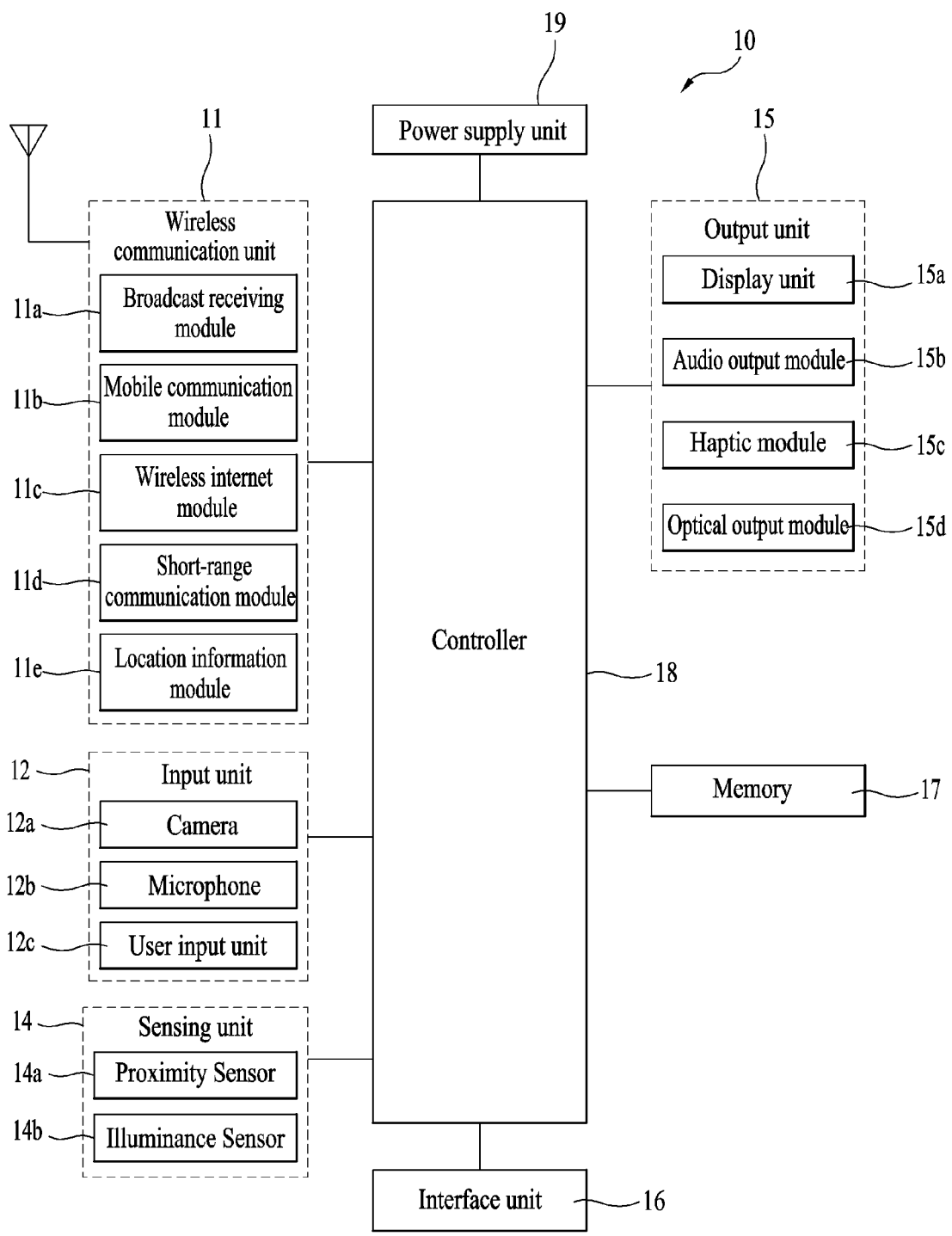
FIG. 1 is a block diagram to illustrate a configuration of a wearable smart device described in the present application.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" or "coupled with" another element, the element can be directly connected with the other element or intervening elements may also be present. In contrast, when an element is referred to as being "directly connected with" or "directly coupled with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present invention includes a combination of features, numerals, steps, operations, components, parts and the like partially omitted from the related or involved features, numerals, steps, operations, components and parts described using the aforementioned terms unless deviating from the intentions of the disclosed original invention.

Smart devices presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of smart devices. However, such teachings apply equally to other types of smart devices, such as those types noted above.

FIG. 1 is a block diagram to describe a wearable smart device related to the present application. A general configuration of the wearable smart device is described with reference to FIG. 1 as follows.

First of all, the wearable smart device 10 may include components such as a wireless communication unit 11, an input unit 12, a sensing unit 14, an output unit 15, an interface unit 16, a memory 17, a controller 18, a power supply unit 19, and the like. It is appreciated that implementing all of the components shown in FIG. 1 is not a requirement, and that greater or fewer components may alternatively be implemented. Moreover, the real shapes and structures of the aforementioned components are not illustrated all but the shapes and structures of some significant components are shown in the drawings following FIG. 1. Yet, it is apparent to those skilled in the art that components described without being illustrated can be included in the wearable smart device to embody the functions of a smart device.

In particular, among the above-listed components, the wireless communication unit 11 typically includes one or more modules which permit communications such as wireless communications between the wearable smart device 10 and a wireless communication system, communications between the wearable smart device 10 and another wearable smart device, communications between the wearable smart device 10 and an external server. Further, the wireless communication unit 11 typically includes one or more modules which connect the wearable smart device 10 to one or more networks.

To facilitate such communications, the wireless communication unit 11 may include one or more of a broadcast receiving module 11a, a mobile communication module 11b, a wireless Internet module 11c, a short-range communication module 11d, and a location information module 11e.

The input unit 12 includes a camera 12a (or an image input unit) for an image or video signal input, a microphone 12b (or an audio input unit) for an audio signal input, and a user input unit 12c (e.g., a touch key, a push key, etc.) for receiving an input of information from a user. Audio or image data collected by the input unit 12c may be analyzed and processed into a user's control command.

The sensing unit 14 is typically implemented using one or more sensors configured to sense internal information of the wearable smart device, the surrounding environment of the wearable smart device, user information, and the like. For example, the sensing unit 14 may include a proximity sensor 14a and an illumination sensor 14b. If desired, the sensing unit 14 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 12a), the microphone 12b, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The wearable smart device 100 disclosed in the present specification may be configured to utilize information obtained from the sensing unit 14, and in particular, information obtained from one or more sensors of the sensing unit 14, and combinations thereof.

The output unit 15 is typically configured to output various types of information, such as audio, video, tactile output, and the like. The output unit 15 may include a display unit 15a, an audio output unit 15b, a haptic module 15c, and an optical output module 15d. The display unit 15a may have an inter-layered structure or an integrated structure with a touch sensor in order to facilitate a touchscreen. The touchscreen may provide an output interface between the wearable smart device 10 and a user, as well as function as the user input unit 12c which provides an input interface between the wearable smart device 10 and the user.

The interface unit 16 serves as an interface with various types of external devices that can be coupled to the wearable smart device 10. The interface unit 16, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the wearable smart device 100 may perform assorted control functions associated with a connected external device, in response to the external device being connected to the interface unit 16.

The memory 17 is typically implemented to store data to support various functions or features of the wearable smart device 10. For instance, the memory 17 may be configured to store application programs (or applications) run in the wearable smart device 10, data or instructions for operations of the wearable smart device 10, and the like. Some of these application programs may be downloaded from an external server via wireless communication. Other application programs may be installed on the wearable smart device 10 at time of manufacturing or shipping, which is typically the case for basic functions of the wearable smart device 10 (for example, receiving a call, placing a call, receiving a message, sending a message, and the like). It is common for application programs to be stored in the memory 17, installed on the wearable smart device 10, and launched by the controller 18 to perform operations (or functions) for the wearable smart device 10.

The controller 18 typically functions to control overall operations of the wearable smart device 10, in addition to the operations associated with the application programs. The controller 18 may provide or process information or functions appropriate for a user by processing signals, data, information and the like, which are inputted or outputted by the various components depicted in the above description, or running application programs stored in the memory 17.

Moreover, in order to launch an application program stored in the memory 17, the controller 18 can control at least one portion of the components described with reference to FIG. 1. Furthermore, the controller 18 controls at least two of the components included in the wearable smart device 10 to be activated in combination to launch the application program.

The power supply unit 19 can be configured to receive external power or provide internal power in order to supply appropriate power required for operating elements and components included in the wearable smart device 100. The power supply unit 19 may include a battery. In particular, the battery may include at least one of a built-in battery or a replaceable (or detachable) battery.

At least some of the components can operate cooperatively to implement the operations, controls or controlling methods of the wearable smart device 10 according to various embodiments mentioned in the following description. And, the operation, control or controlling method of the wearable smart device 10 may be implemented on the wearable smart device 10 by launching at least one application program saved in the memory 17.

In the following drawings, the wearable smart device 10 is illustrated as having a type wearable on a user's body, and more particularly, on a user's wrist, i.e., a bangle shape. And, the wearable smart device 10 may have a shape of a watch similarly worn on a wrist. Thus, the wearable smart device 10 may alternatively be embodied to have any of a variety of different configurations. For instance, the wearable smart device 10 may have a necklace shape or a ring shape. Discussion herein will often relate to a particular type of the wearable smart device 10. However, such teachings with regard to a particular type of the wearable smart device 10 will generally apply to other types of wearable smart devices as well.

Figure 2:
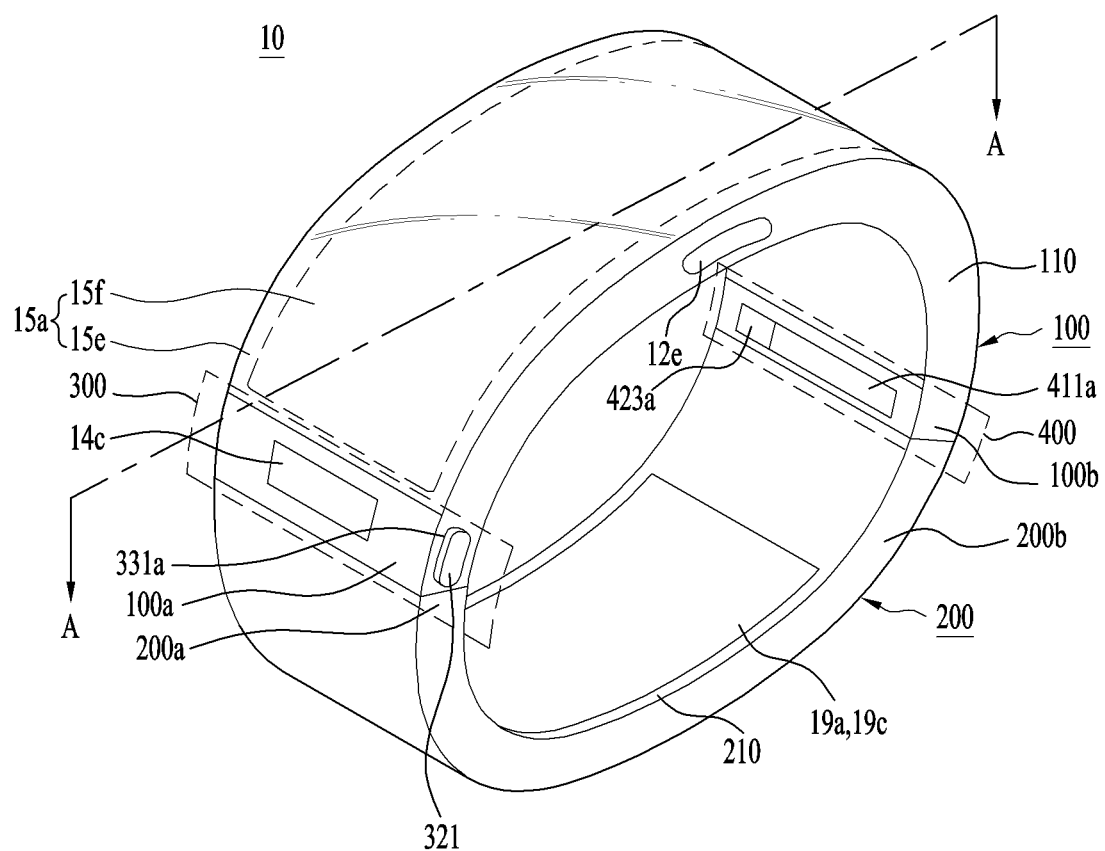
FIG. 2 is a perspective diagram of a wearable smart device according to one example of the present application.
Figure 3:
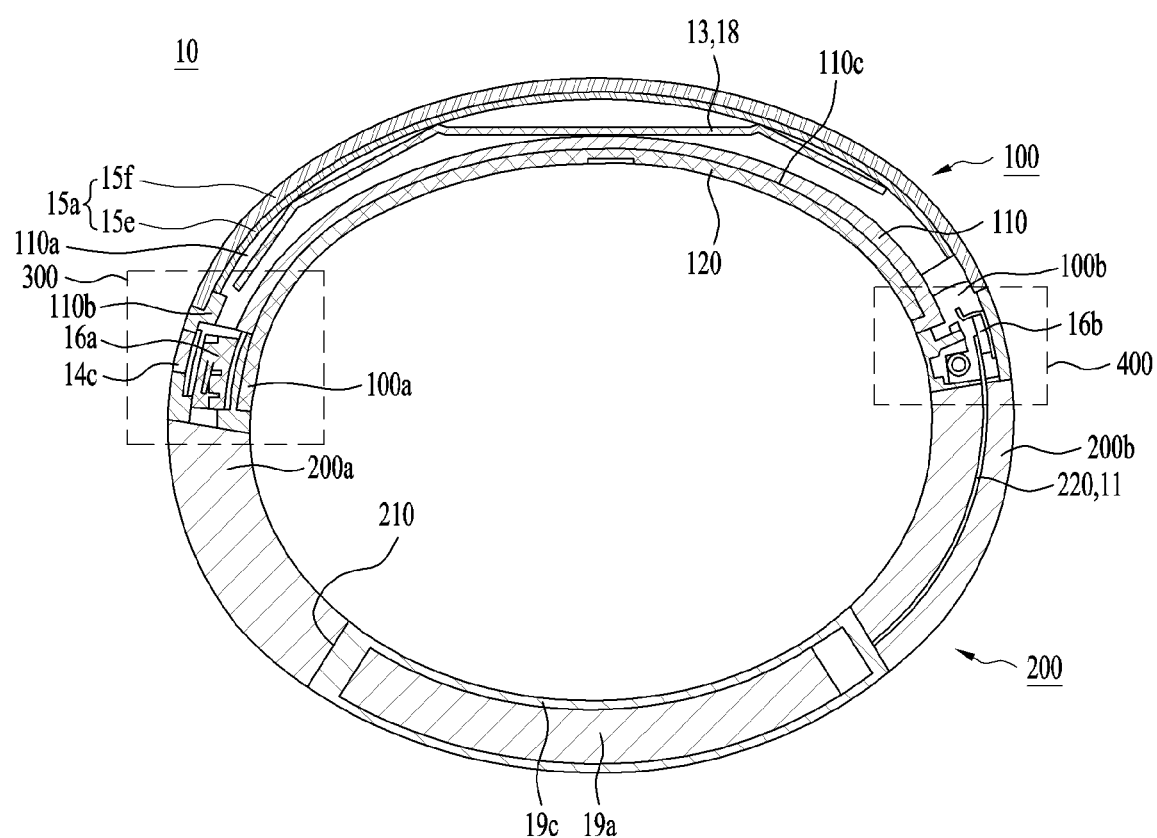
FIG. 3 is a cross-sectional diagram of a wearable smart device bisected along a line A-A shown in FIG. 2.

In continuation with the general configuration of the wearable smart device 10 mentioned in the foregoing description, a whole structure of the wearable smart device 10 is schematically described with reference to the related drawings as follows. With respect to this, FIG. 2 is a perspective diagram of a wearable smart device according to one example of the present application, and FIG. 3 is a cross-sectional diagram of the wearable smart device bisected along a line A-A shown in FIG. 2. Since FIG. 2 and FIG. 3 show the overall structure of the wearable smart device 10, all the following description of the present application shall refer to FIG. 2 and FIG. 3 basically unless prescribed drawings are mentioned to be specially referred to.

First of all, a wearable smart device (hereinafter called 'device') 10 can include a body 100. The body 100 can provide a user with most of functions as a smart device and is correspondingly configured to contain various parts therein. Substantially, the device 10, and more particularly, the body 100 can have a housing or case 110. An inner space in prescribed size, as shown in the drawings, can be formed in the body 100, and more particularly, in the case 110 to accommodate various parts therein. Moreover, referring to FIG. 3, the case 110 can have an opening 110a configured to communicate with the inner space to install the parts in the inner space. Although the case 110 may consist of an assembly of members assembled together, it may consist of a single member overall to enable the body 100 or the device 10 to become compact.

Meanwhile, the wearable smart device 10 is wearable on various body parts of a user. Particularly, the wearable smart device 10 can be worn as a watch or bangle on a user's wrist among various body parts of the user. In order for the wearable smart device 10 to provide various functions as a smart device by being worn on a user's wrist, the body 100 can have a plate shape overall. Moreover, as a wrist of a user includes a considerable curvature, the wearable smart device 10 can have a curvature roughly matching a shape of the user wrist, and more particularly, a curvature of the wrist in order to be winded round the wrist. Hence, the body 100 or case 110 as a portion of the wearable smart device 10 can have a prescribed curvature according to the curvature of the user's wrist.

The wearable smart device 10 can also include a band 200 connected to the body 100. Since the body 100 consists of the case 110 configured to accommodate parts, the band 200 can be substantially connected to the case 110. As mentioned in the foregoing description, in order for the device 10 to be wearable on a user's wrist having a prescribed curvature, the band 200 has a curvature roughly matching a shape of the user wrist, i.e., a curvature of the user wrist shape and may have a plate shape overall. Hence, the body 100 and the band 200 connected to each other, i.e., the device 10 can have a closed loop or ring shape configured to enclose the user's wrist overall. Owing to such a shape, the device 10 can basically function as an accessory such as a bangle or a bracelet.

As the body 100 accommodates or receives various parts therein, it is necessary to be configured to protect these parts. Hence, the body 100, and more particularly, the case 110 can be configured non-deformable, i.e., rigid and may be formed of a relatively rigid material such as metal, plastics or the like. On the other hand, the band 200 can be configured to have the device 10, and more specifically, the body to be worn on the wrist. In particular, in order for the device to be worn on or removed from a user's wrist, it is necessary for the device 10 to be opened. In more particular, a portion of the device 10 of the closed ring type needs to be discontinuous. Through a gap (or, clearance) formed by such discontinuity, the user's wrist is inserted in the device 10 and can be then enclosed by the device 10. Through the gap, the user's wrist can be withdrawn and separated from the device 10. Yet, as mentioned in the above description, since the body 100 is formed rigid, the band 200 can be separated from the body 100 or disconnected selectively to form the gap on behalf of the body 100. Moreover, the gap formed by the separation or disconnection of the band 200 may need to be additionally extended to enable the user's wrist to be inserted in or escape through the gap. Hence, in order for the user to smoothly wear or remove the device 10 through the extension of the gap, it is necessary to deform the device 10, and more particularly, the band 200 with restoration capability. For this reason, the band 200 may be formed of substance having prescribed flexibility or elasticity. For instance, the band 200 may be made of at least one of leather, rubber, silicon synthetic resin and the like.

If the band 200 is cut or separated into two parts in order to provide the gap, the cut or separated parts should be connected again to enable the device 10 to be worn stably. Hence, for the selective separation and connection, a fastener (not shown in the drawing) can be attached to the band 200. For instance, the fastener can be embodied with one of a buckle, a snap-fit capable hook structure, Velcro™, and the like. Yet, since such an attachment as the fastener is projected from the device 10, and more particularly, from the band 200, a volume of the device 10 increases and the device 10 cannot have a good exterior. Hence, in order for the band 200 to form the gap by itself, it can be directly separated from the body 100. In particularly, the band 200 can be configured to be detachably coupled with the body 100. Owing to the detachable band 200, the gap is formed not in the band 200 but between the band 200 and the body 100. If the band 200 is configured detachable from the body 100, a structure for separating or coupling the band 200 and the body 100 selectively can be installed in the body 100 without being externally exposed from the device 10. In particular, the attachment like the fastener exposed from the band 200 externally is not required. Hence, as shown in FIG. 2 and FIG. 3, the band 200 can be formed smoothly like the body 100. For this reason, the device 10 can have a slim and unified exterior owing to the band 200 detachable from the body 100. Thus, the improved exterior enables the device 10 to substantially become not only a smart device but also a bangle or bracelet as an accessory.

Meanwhile, since people's wrists differ from each other in size, it is necessary to adjust a size of the device 10, and more particularly, a circumferential length of the device 10 to fit a size of a real wrist of a user in order for the device 10 to be stably worn on the corresponding wrist. If such an attachment as a fastener is provided to the device 10, the circumferential length of the device 10 (i.e., the band 200) can be adjusted to fit a user's wrist. Yet, if the band 200 is provided in a manner of being detachable from the body 100 without such an attachment for the improved exterior of the device 10, it is necessary to adjust the size of the device 10 in other ways. Hence, instead of directly adjusting the size (i.e., circumferential length) of the band 200, the band 200 can be replaced by another band having a different size. By the replacement of the band 200 only, the size of the device 10 can be easily adjusted to fit a user's wrist. In particular, in order to enable the band replacement, the band 200 can be configured fully detachable from the body 100. As mentioned in the foregoing description, in order for the device 10 to be worn or removed by a user, the band 200 can be detachably coupled with the body 100. Considering a shape of the device 10 configuring a closed ring overall, the band 200 can be connected to the body 100 at two points, as shown in the drawings. If the band 200 is separated from the body 100 at one of the two points, as mentioned in the foregoing description, the gap or clearance for wearing or removing the device 10 can be formed. Hence, the separation of the band 200 at one of the two connected points may be required for the wearing or removal of the device 10. In particular, for the wearing or removal of the device 10, the band 200 can be separated from the body 100 in part. On the other hand, as mentioned in the foregoing description, for the size adjustment of the device 10, i.e., for the replacement of the band 200, the band 200 can be fully separated from the body 100. Eventually, referring to FIG. 2 and FIG. 3, the device 10 according to one example of the present application may require a partial separation of the band 200 for the wearing and removal or a full separation of the band 200 for the replacement of the band 200. Hence, according to the above-described configuration of the band 200, the device 10 can provide the sufficient functionality for the wearing and removal by enhancing the overall exterior of its own. For the separation structure of the band 200, the device 10 includes a first connector 300 and a second connector 400. And, the first and second connectors 300 and 400 shall be described in detail with reference to the related drawings later.

As mentioned in the foregoing description, in aspect of functionality, the body 100 can be basically configured to support various electronic and mechanical parts required for operations of the wearable smart device 10. And, the body 100 can be configured to from a space for accommodating the various parts. Since the overall structure and of the wearable smart device 10 and the respective parts of the wearable smart device 10 are well illustrated in FIG. 2 and FIG. 3, inner parts of the device 10 shall be described in detail with reference to FIG. 2 and FIG. 3 again in the following.

First of all, the wearable smart device 10 may include a display unit 15a as the output unit 15. While a user wears the wearable smart device 10, the display unit 15a can be exposed from the device 10 to be shown well to the user. In order to be exposed to the user, the display unit 15a may be disposed on an outer circumference part of the body 100. Hence, the display unit 15a can be externally exposed from the body 100 and is also able to form an exterior of the body 100. In particular, the display unit 15a can be disposed to cover the opening 110a of the body 100, i.e., the case 110. And, the display unit 15a can have a curvature corresponding to that of the body 100 to form an exterior of the curved body 100. Referring to FIG. 3, the case 110 can have a seat 110b including a flange configured to extend inside the opening 110a and the display unit 15a can be disposed on the seat 110b. Hence, the case 110, i.e., the body 100 can stably support the display unit 15a. As mentioned in the foregoing description, the display unit 15a is disposed on the outer circumference of the body 100 to be exposed to a user. In this case, a decoration member 120 can be disposed on an inner circumference part of the body 100 to oppose the display unit 15a. The decoration member 120 can have various colors and patterns, thereby enhancing the exterior of the device 10. The decoration member 120 has a curvature corresponding to that of the body 100 as well and can be inserted in a recess 110c formed on the inner circumference of the case 100.

The display unit 15a can provide a user with various information. In particular, the display unit 15a can display information processed by the wearable smart device 10. For instance, the display unit 15a basically outputs various images and text information and is also able to display a running screen information of an application program run in the wearable smart device 10 or a UI (user interface) or a GUI (graphic user interface) according to the running screen information. Moreover, the display unit 15a can inform a user of a current time. In order to display the current time, the display unit 15a can directly display numerals corresponding to the current time or may display a dial or face and hands like an analog watch. In particular, the display unit 15a and other electronic parts related to the display unit 15a can implement an electronic and virtual watch in the wearable smart device 10.

The display unit 15a may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 15a may include a display module 15f and a window 15e configured to cover the display module 15f. The display module 15f may include the aforementioned display device such as LCD, OLED, or the like and is the component that actually displays image information. Moreover, if necessary, at least two display units 15a can be provided to the wearable smart device 10. For instance, an additional display unit can be installed to be exposed to a user at a location opposing the illustrated display unit 15a. In particular, the additional display unit may be provided to a bottom portion of the band 200 configured to oppose the display unit 15a provided to a top portion of the body 100 shown in FIG. 2.

The display unit 15a may include a display module 15f and a window 15e configured to cover the display module 15f. The display module 15f may include the aforementioned display device such as LCD, OLED, or the like and is the component that actually displays image information. The window 15e may be disposed on a portion of the display module 15f exposed to a user and is able to protect the display module 15f externally. In addition to the protective functions, the window 15e should be configured to allow the information, which is displayed on the display module 15f, to be viewed by a user. Therefore, the window 15e may be formed of material having proper strength and transparency. In particular, the window 15e can function as a glass or crystal member of a normal watch. Moreover, if the window 15e is formed of a transparent material overall, other parts or inner parts of the wearable smart device 10 may be exposed to a user as well as the display module 15f. Hence, such exposure may degrade the exterior of the device 10. Preferably, a portion of the window 15e except a prescribed region for exposing the image information of the display module 15f can be configured non-transparent. In particular, a non-transparent layer may be coated on or attached to an outer circumference configured to enclose the display module 15f on a backside of the window 15e. Such a non-transparent layer may be called a bezel. The display module 15, as shown in the drawings, can be directly attached to the backside of the window 15e. In doing so, the display module 15f can be directly attached to the window 15e in various ways. For instance, an adhesive is most conveniently available for the direct attachment.

In order to receive a control command by a touch mechanism, the display unit 15a may include a touch sensor configured to sense a touch to the display unit 15a. Using this, if a touch is applied to the display unit 15a, the touch sensor senses the corresponding touch and is then able to generate a control command corresponding to the touch based on the sensed touch. Contents inputted by the touch mechanism may include texts, numerals, menu items indicated or designated in various modes, and the like. The touch sensor may be configured in a form of a film having a touch pattern and disposed between the window 15e and the display module 15f, or include a metal wire which is patterned directly on a backside of the window 15e. Alternatively, the touch sensor may be integrally formed with the display module 15f. For instance, the touch sensor may be disposed on a substrate of the display module 15f or inside the display module 15f. Thus, the display unit 15a may also form a touchscreen together with the touch sensor. In this case, the touchscreen may serve as the user input unit 12c (see FIG. 1). If necessary, a physical key (e.g., a push key) may be additionally provided as the user input unit 12c adjacent to the display unit 15a corresponding to the touchscreen to facilitate user's inputs. According to the complicated configuration of the display module 15f, the display module 15f is depicted as a module or assembly consisting of a multitude of layers or parts in the accompanying drawings.

A circuit board 13 is the component on which various electronic parts, and more particularly, processors configuring the controller 18 are mounted together with other circuits and devices supporting them and may be installed in the body 100, i.e., the case 110. Besides, the respective components 11 to 19 shown in FIG. 1 may be directly installed on the circuit board 13 to be controlled by the controller 18 or may be electrically connected to the circuit board 13 by being installed in the case 110, which fails to be shown in detail. For instance, the controller 18 can receive a command by a touch from the touch sensor of the window 15e via the wiring 13a and is able to control various parts including the display module 15f based on the received command. Hence, the controller 18 can be called one of various names such as a controller, a controlling device and the like and is able to control the wearable smart device 10 and all the components of the wearable smart device 10. Such controllable components include not only the components shown in FIG. 1 but also other components mentioned in the following description.

Since the wearable smart device 10 functions as an accessory like a bangle or bracelet, the device 10 needs to be compact to have a good exterior. Yet, the device 10 requires lots of parts for functions of a smart device. If all these parts are accommodated in the body 100, the body 100 may have a considerably large size. And, such a large size may not be preferable for a good exterior as an accessory. Therefore, in the device 10 according to one example of the present application, all the parts are not disposed in the body 100 but the band 200 may be configured to accommodate some of the parts.

The wearable smart device 10 may further include a battery 19a as the power supply unit 19 configured to supply power. The battery 19a generally has a considerable volume that may increase in proportion to capacity for providing a sufficient operational time to the device 10. Hence, in consideration of a limited space within the body 100 and the case 110, the battery 19a may be disposed in the band 200. First of all, the battery 19a may be detachably installed in the band 200. Referring to FIG. 2 and FIG. 3, the band 200 may include a prescribed recess 210 and the battery 19a can be inserted in or withdrawn from the recess 210. In particular, the battery 19a can be accommodated in a housing 19c. In this case, the housing 19c may include a mechanism configured to be engaged with or released from an inner wall of the band 200, i.e., the recess 210. In particular, the battery 19*a* and the housing 19*c* can substantially configure a battery module detachable from the band 200. Hence, such a modularized battery 19*a* facilitates its insertion or withdrawal and is able to provide convenience to a user. On the other hand, the battery 19*a* may be built in the band 200. In particular, the battery 19*a* is disposed in the band 200 by avoiding external exposure, thereby being substantially integrated with the band 200. Meanwhile, although the battery 19*a* is integrally formed with the band 200, it may be externally exposed from the band 200.

As mentioned in the foregoing description, since the battery 19*a* has a considerably large size, the device 10 may be heavier than the band 200 including relatively less parts. If the battery 19*a* is eccentric from a weight center of the band 200, the device 10 may be worn on a user's wrist by losing balance to cause inconvenience to the corresponding user. Hence, the battery 19*a* may be disposed on a center (i.e., weight center) of the band 200. In particular, as shown in the drawings, the battery 19*a* may be disposed on a center portion of the band 200 in a length direction. Moreover, the battery 10*a* is disposed on the band 200, whereas various parts requiring the power of the battery 19*a* are disposed on the body 200. Hence, referring to FIG. 2, the band 200 may include a connecting module 220 configured to supply the power of the battery 19*a* to the body 100. In order to supply the power, one end portion of the connecting module 220 may be connected to the battery 19*a* and the other end portion of the connecting module 220. The connecting module 220 may include a wire and an insulator configured to cover the wire. In particular, the connecting module 220 can be configured to electrically connect the body 100 and the battery 19*a* to each other for the supply of the power. The battery 19*a* can be charged by an external power source. If the battery 19*a* is attached to the device 10, and more particularly, to the band 200, a charging terminal may be provided to the body 100 or the band 200 and may be connected to the external power source through a power cable. Moreover, if the battery 19*a* is separated from the device 10, the battery 19*a* may be connected to a separate charger to be charged with an external power. On the other hand, the battery 19*a* may be configured to enable the wireless charging through a wireless charging device. In this case, the wireless charging may be embodied by magnetic induction or resonance (e.g., magnetic resonance).

Referring now to FIG. 2, since the body 100 has a limited space, the wireless communication unit 11 may be included not in the body 100 but in the band 200. The wireless communication unit 11, as shown in the drawing, can be provided as a single communication module into which the broadcast receiving module 11*a*, the mobile communication module 11*b*, the wireless Internet module 11*c*, the short-range communication module 11*d*, and the location information module 11*e* are integrated together. For instance, Bluetooth, NFC, Wi-Fi and the like can be integrated into a single communication module. Moreover, an antenna may be additionally integrated with the wireless communication unit 11. Hence, the wireless communication unit 11 can communicate with an external device and/or a network in all possible ways. Besides, the wireless communication unit 11, i.e., the communication module may be integrally formed with the connecting module 220. By such integration, product costs of the device 10 can be reduced and assembly productivity of the device 10 can be raised. Besides, since the integrated communication and connecting module has a small volume, a size of the band 200 may not increase substantially.

By disposing prescribed parts, the battery 19*a* and the communication module 11 in the band 200, the respective parts of the device 10 can be distributed to the body 100 and the band 200. Hence, it is able to utilize the inner space of the device 10 as efficiently as possible. Owing to such optimal disposition, a total size of the device 10 can be designed considerably compact so that the exterior of the device 10 can be further enhanced. Meanwhile, as most of the parts mentioned in the foregoing description have considerably large sizes, they need to have shapes fit for the device 10 in order to be accommodated or installed in the wearable smart device 10 (e.g., body 100, band 200). For such reasons, each of the wireless communication unit 11, the circuit board 13, the display unit 15*a*, the battery 19*a* and the like can be prepared to have a prescribed curvature. Particularly, the display unit 15*a*, i.e., the module 15*e* and the window 15*f* may include a flexible display formed of such deformable material as plastics overall. Likewise, for flexibility sufficient for deformation with a prescribed curvature, the wireless communication unit 11 and the connecting module 220, i.e., the integrated communication/connecting module may include FPCB (flexible printed circuit board). Although the circuit board 13 may consist of FPCB, it fails to have rigidity enough to install lots of electronic parts and processors. Hence, referring to FIG. 2, the circuit board 13 may include a general PCB (printed circuit board) that is bent. The bent circuit board 13 can be inserted into the body 100 and have space and rigidity enough to install lots of electronic parts thereon.

Meanwhile, as mentioned in the foregoing description, for the wearing/removal of the device 10 and the size adjustment of the device 10 (i.e., the replacement of the band 200), the band 200 can be coupled with the body 100 in a manner of being basically detachable. Since the device 10 has a closed ring shape as a bangle or bracelet, the body 100 and the band 200 may be coupled with each other at two different points. In particular, the body 100 may have a first end portion 100*a* and a second end portion 100*b* configured to oppose each other and the band 200 may have a first end portion 200*a* and a second end portion 200*b* configured to oppose each other. The first end portion 100*a* of the body 100 and the first end portion 200*a* of the band 200 may be connected to each other and the second end portion 100*b* of the body 100 and the second end portion 200*b* of the band 200 may be connected to each other. Hence, considering such connection relation, as shown in FIG. 2 and FIG. 3, the device 10 can have two mechanisms (i.e., first connector 300 and a second connector 400) for connecting the body 100 and the band 200 to each other. First of all, the first connector 300 may be configured to couple/separate the first end portion 200*a* of the band 200 with/from the body 100. And, the second connector 400 may be configured to couple/separate the second end portion 200*b* of the band 200 with/from the body 100. Moreover, since the body 100 similarly has the first end portion 100*a* and the second end portion 100*b*, the first connector 300 may be configured to couple/separate the first end portion 200*a* of the band 200 with/from the first end portion 100*a* of the body 100 and the second connector 400 may be configured to couple/separate the second end portion 200*b* of the band 200 with/from the second end portion 100*b* of the body 100.

Figure 4:
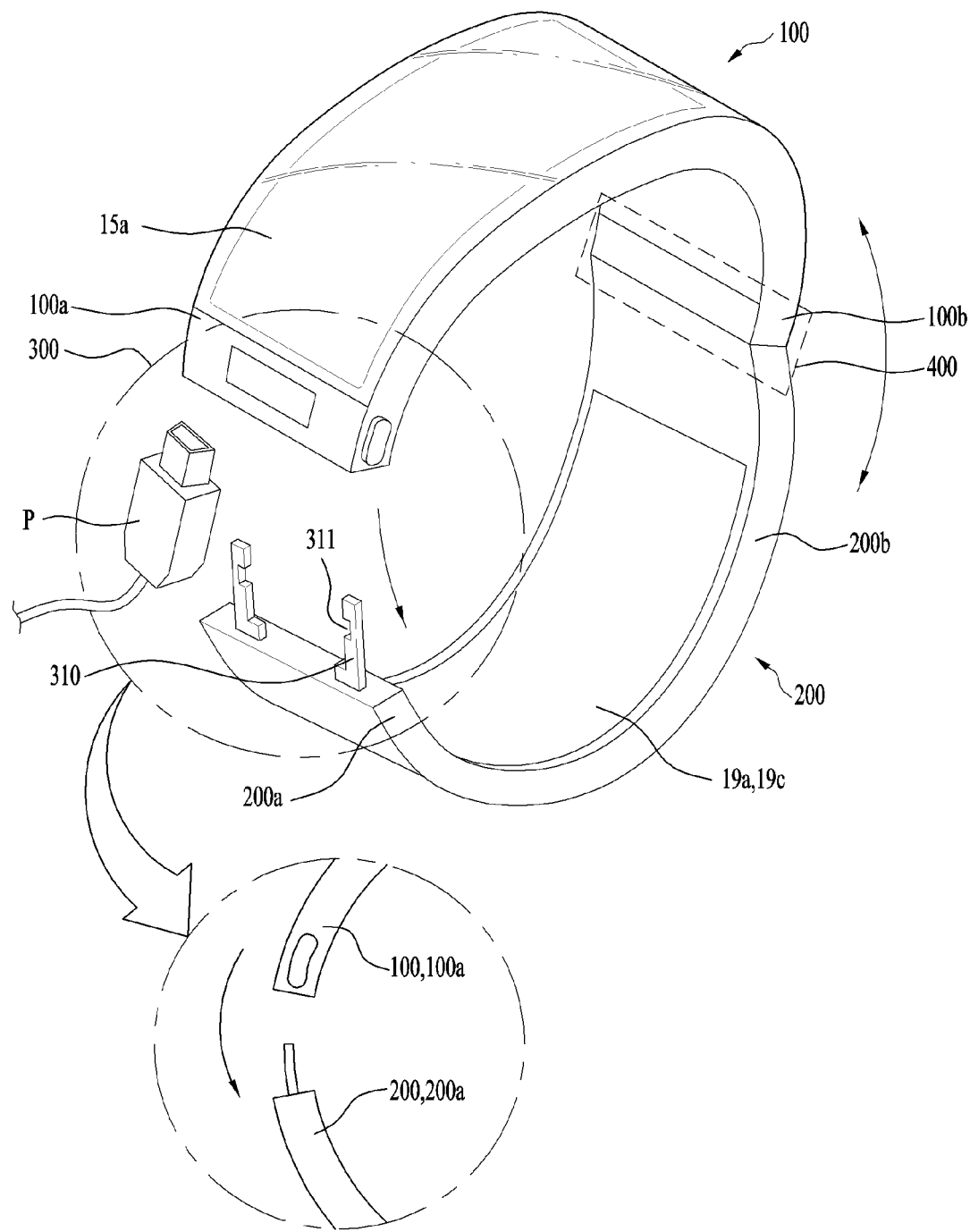
FIG. 4 is a perspective diagram and a partially enlarged diagram to illustrate a body and band of a wearable smart device separated from each other in a first connector.
Figure 9:
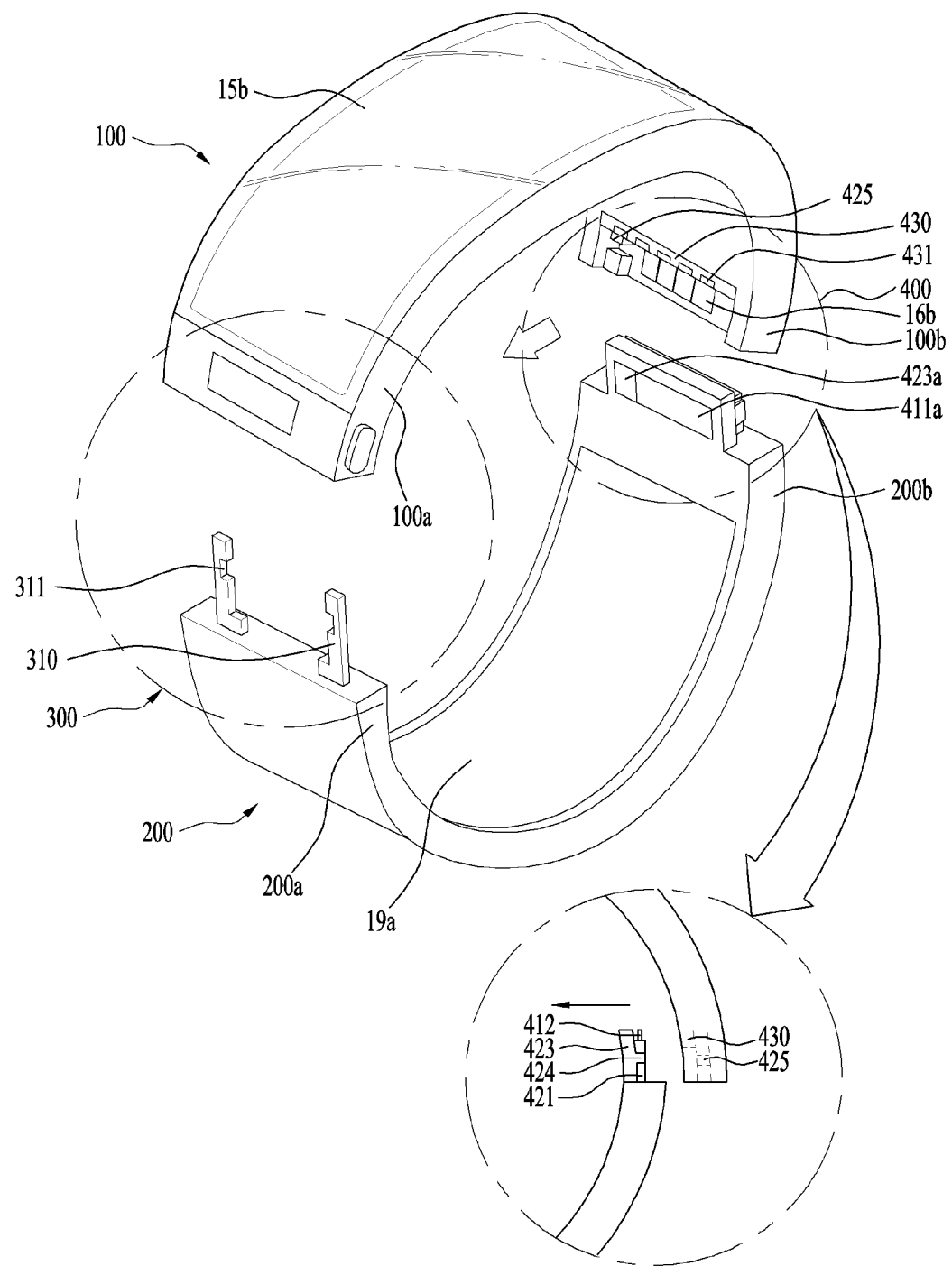
FIG. 9 is a perspective diagram and a partially enlarged diagram to illustrate a body and band of a wearable smart device separated from each other in a first connector and a second connector.

Moreover, the first connector 300 and the second connector 400 can selectively separate the first end portion 200*a* and the second end portion 200*b* of the band 200 from the body 100 to provide different functions, respectively, As discussed in the foregoing description, the separation of the band 200 required for the wearing/removal of the device 100 may become different from the separation of the band 200 required for the size adjustment of the device 10. The selective separations in the connectors are described in detail with reference to the accompanying drawings additionally related to FIG. 2 and FIG. 3 as follows. Regarding this, FIG. 4 is a perspective diagram and a partially enlarged diagram to illustrate a body and band of a wearable smart device separated from each other in a first connector, and FIG. 9 is a perspective diagram and a partially enlarged diagram to illustrate a body and band of a wearable smart device separated from each other in a first connector and a second connector.

As discussed in the foregoing description, if the band 200 is separated from the body 100 in one of the first connector 300 and the second connector 400, a gap or clearance may be formed in the device 10, and more particularly, between the body 100 and the band 200. Through the gap, a user's wrist can be inserted in the device 10 by being enclosed by the body 100 and the band 200. After the insertion, the band 200 and the body 100 can be re-connected to each other. On the other hand, the user's wrist can be withdrawn from the device 10 through the gap. By the insertion or withdrawal, the device 10 may be worn on or removed from a user. Eventually, the wearing and removal of the device 10 can be achieved by the partial separation of the band 200, and more particularly, by the separation of the band 200 in one of the connectors 300 and 400 from the body 100. Moreover, although the partial separation may be performed by one of the connectors 300 and 400, as shown in FIG. 4, the first connector 300 in the device 10 according to one example of the present application can perform the partial separation of the band 200. In particular, in order for a user to wear or remove the device 10, the first connector 300 may be configured to separate the band 200, and more particularly, the first end portion 200a of the band 200 from the body 100. Moreover, since the wearing or removal of the device 10 requires the separation of the band 200 from the body 100 in one of the connectors 300 and 400 only, the first connector 300 can separate the band 200 from the body 100 only. In particular, for the wearing and removal of the first device 10, the band 200 can be separated from the first connector 300 only. On the other hand, referring to FIG. 4, the second connector 400 can maintain the coupling between the body 100 and the band 200. Moreover, referring to FIG. 4, since the band 200 is made of a flexible material, the band 200 can extend the gap formed by the first connector 300 by being deformed. User's wrist can be easily inserted in or withdrawn through the extended gap, whereby the user can wear or remove the device 10 easily and conveniently.

On the other hand, as mentioned in the foregoing description, since the device 10 does not include such a general length adjustment attachment as a fastener provided to the band 200 in order to have an improved exterior, it is necessary for the band 200 to be replaced by a band in a different size in order to adjust a size of the device 10. Such a replacement of the band 200 and a corresponding size adjustment of the device 10 can be achieved by the full separation of the band 200 from the body 100. In particular, referring to FIG. 9, in order to replace the band 200 by a different band and adjust a size of the device 10, the first connector 300 and the second connector 400 can fully separate the band 200 from the body 100. In particular, the first connector 300 and the second connector 400 can be configured to separate both of the first and second end portions 200a and 200b of the band 200 from the body 100.

Each of the above-configured first and second connectors 300 and 400 may require user's manipulation to separate the band 200 from the body 100. Yet, if the first connector 300 and the second connector 400 are located adjacent to each other, it may be inconvenient for a user to manipulate the first connector 300 and the second connector 400. Hence, the first connector 300 and the second connector 400 may be disposed in a manner of being spaced apart from each other in a prescribed distance. In particular, as well shown in FIG. 2, after the device 10 has been worn on a user's wrist, the first connector 300 and the second connector 400 can be disposed adjacent to both lateral parts of the hand of the user, respectively. Owing to such a disposition, the first connector 300 and the second connector 400 are spaced apart from each other in a sufficient distance and can be directly accessed by the user. Hence, the user can conveniently separate the band 200 by easily manipulating the first connector 300 and the second connector 400.

Figure 5:
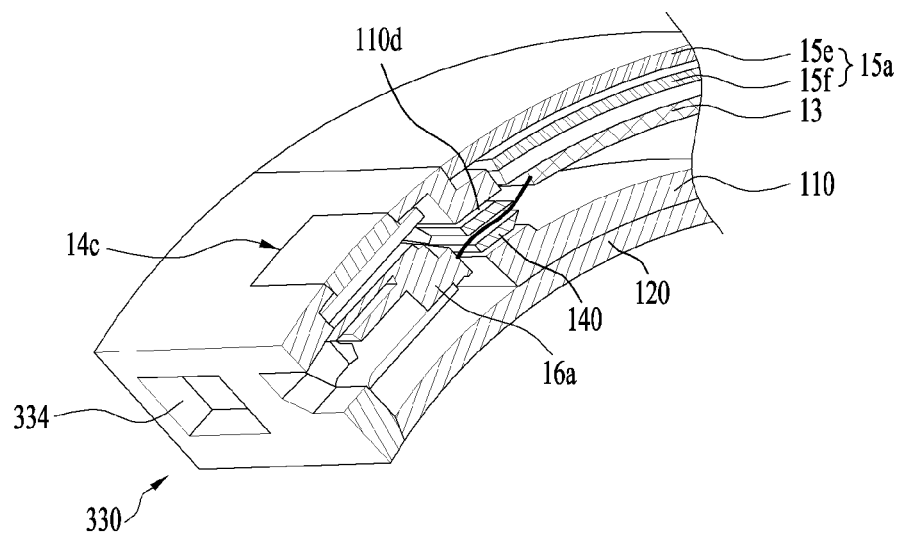
FIG. 5 is a partial cross-sectional diagram of a band separated body.
Figure 6:
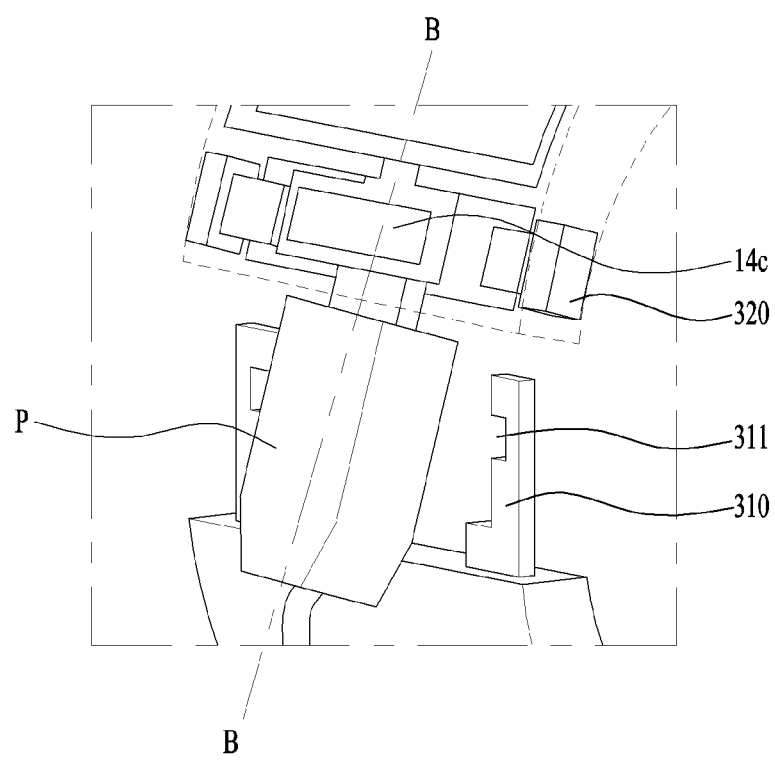
FIG. 6 is a partial perspective diagram to illustrate a body connected to an external power source in a state separated from a band.
Figure 7:
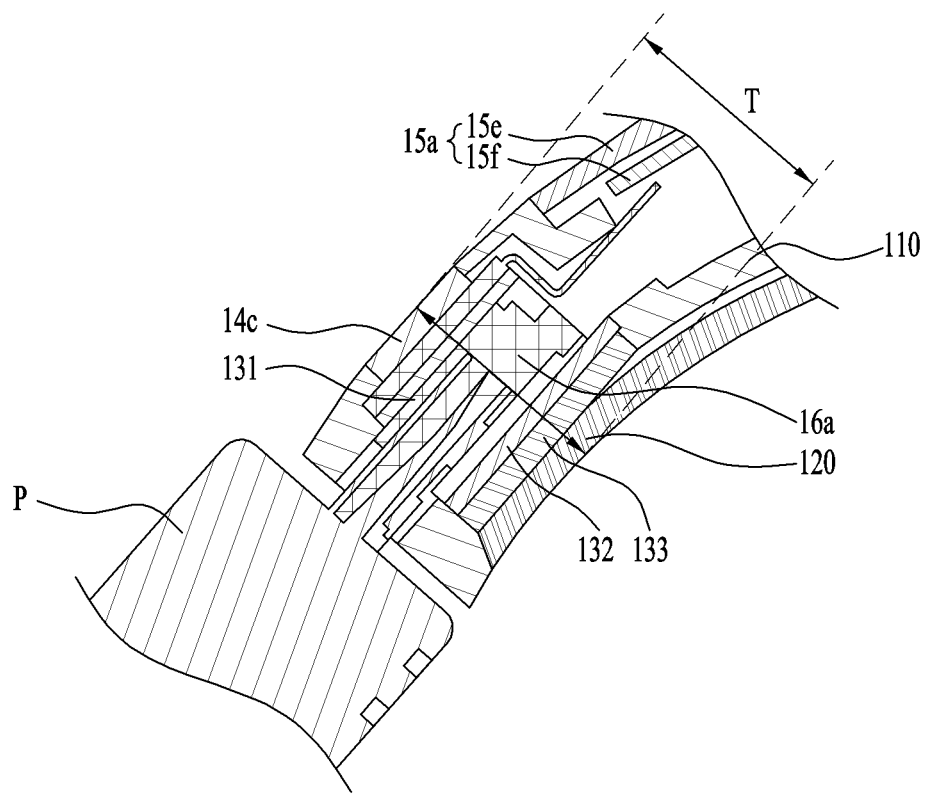
FIG. 7 is a cross-sectional diagram obtained along a line B-B shown in FIG. 6.

In continuation with the basic functions of the first connector 300 and the second connector 400, structures of the first connector 300 and the second connector 400 are described in the following. First of all the structure of the first connector 300 is described with reference to the related drawings. FIG. 5 is a partial cross-sectional diagram of a band separated body. FIG. 6 is a partial perspective diagram to illustrate a body connected to an external power source in a state separated from a band. And, FIG. 7 is a cross-sectional diagram obtained along a line B-B shown in FIG. 6. For better understanding, FIGS. 2 to 4 shall be referred to in the following description.

First of all, since the device 10 includes various electronic parts, it is necessary to be supplied with a power continuously to operate the electronic parts. Hence, the device 10 may include a first terminal 16a configured as the interface unit 16 to supply a power to the body 100. The first terminal 16a may consist of general power supply terminals. Yet, such general terminals have a size relatively greater than that of the compact device 10, and more particularly, the compact body 100 or the compact band 200. Particularly, the general terminals are formed relatively thick and long. Hence, the general terminals are curved overall and may have difficult in being disposed in the body 100 or band 200, which is configured to accommodate various parts therein, and more particularly, in the central portions of the body 100 and the band 200. On the contrary, since the first connector 300 and the second connector 400 are disposed on the end portions 100a, 100b, 200a and 200b of the body 100 and the band 200, they are spaced apart from major parts and may have relatively small curvatures. Hence, the first terminal 16a may be disposed in one of the first connector 300 and the second connector 400 or may be disposed adjacent to the first connector 300 and the second connector 400. In particular, the first terminal 16a may be disposed at one of the end portions 100a, 100b, 200a and 200b of the body and band or may be disposed adjacent to one of them.

Meanwhile, since the device 10 is worn on a user's wrist in most cases, it may be exposed to water. For instance, if hands are washed or it rains, the device 10 may be exposed to water. In case that the first terminal 16a is always externally exposed from the device 10, water may flow into the first terminal 16a to possibly cause failure of the device 10. Therefore, the first terminal 16a may be disposed in one of the first connector 300 and the second connector 400 in a manner of avoiding its exposure all the time. Yet, when the first terminal 16a is connected to an external power source at least, the first terminal 16a should be externally exposed from the device 10, it can be configured to be selectively exposed. Since a user frequently wears and removes the device 10, the band 200 may be frequently separated from the body 100 and the first connector 300, i.e., the first end portions 100a and 200a of the body 100 and the band 200 may be externally exposed frequently. Hence, for the selective exposure, the first terminal 16a may be disposed in the first connector 300, and more particularly, at one of the first end portions 100a and 200a or may be disposed adjacent to it. Moreover, since the body contains most of the electronic parts, the first terminal 16a may be disposed in the body 100, and more particularly, at the first end portion 100a to facilitate the power supply to these parts. Eventually, as well shown in FIG. 5, the body 100 may have the first terminal 16a disposed in the first connector 300 or the first end portion 100a of the body 100 or may have the first terminal 16a disposed adjacent to the first connector 300 or the first end portion 100a of the body 100. Moreover, when the first connector 300 separates the band 200 from the body 100, the first terminal 16a is exposed from the body 100 and may be connected to the external power source. If the first connector 300 couples the band 200 and the body 100 together, i.e., while a user is wearing the device 10, the first terminal 16a can be hidden and protected against water. Thus, the first terminal 16a is externally exposed to perform an intended function only if the band 200 is separated by the first connector 300. Hence, the first terminal 16a is not seen while the user is wearing the device 10. Accordingly, the above-described first terminal 16a enhances the exterior of the device 10 and also helps a user use the device 10 conveniently.

As mentioned in the foregoing description, various kinds of general power supply terminals are applicable to the first terminal 16a. Among the general terminals, USB terminal enables data an exchange between the device 10 and an external device as well as a power supply. Hence, in order to provide an additional function, the first terminal 16a may include a USB terminal. When such a first terminal 16a is exposed due to the separation of the band 200 by the first connector 300, as shown in FIG. 4, FIG. 6 and FIG. 7, the first terminal 16a can be connected to an external power source to supply a power to the body 100 using a charging cable P. The first terminal 16a includes a female terminal, as shown in the drawing, and the charging cable P may have a male terminal configured to be inserted in the first terminal 16a. Meanwhile, the device 10 may include user's personal information by applying a role as a smart device. For instance, information such as contacts, text messages and the like can be saved in the device 10. Moreover, since a smart device makes an electronic payment recently, the device 10 can store user's financial information as well. In order to protect such sensitive information, it is necessary to provide a security device to the device 10. Hence, the device 10, as well shown in FIGS. 5 to 7, may include a recognition module 14c, which is provided as the sensing unit 14 shown in FIG. 1, configured to recognize a user's fingerprint. The recognition module 14c recognizes a fingerprint of a user and the controller 18 is then able to compare the recognized fingerprint to a previously registered fingerprint. If the recognized fingerprint matches the registered fingerprint, the user can access a prescribed information saved in the device 10 or may instruct the device 10 to perform a prescribed operation. On the other hand, if the recognized fingerprint fails to match the registered fingerprint, the access to the corresponding information or the instruction of the prescribed operation may be rejected. Hence, the recognition module 14c can provide sufficient security to the device 10. The above-described recognition module 14c has a relatively large size in comparison with the compact device 10 like the first terminal 16a. Hence, for the same reason of the aforementioned first terminal 16a, the recognition module 14c may be disposed in one of the first connector 300 and the second connector 400 or may be disposed adjacent to the connectors. Moreover, since the recognition module 14c has a shape (i.e., a large size) feature similar to that of the first terminal 16a, if the recognition module 14c and the first terminal 16a are disposed at different portions of the device 10, respectively, the different portions of the device 10 need to be designed individually to accommodate the recognition module 14c and the first terminal 16a appropriately. Hence, if the recognition module 14c and the first terminal 16a are disposed adjacent to each other at least, it may be preferable to reduce design considerations. Moreover, it may be preferable that the recognition module 14c is disposed to facilitate a connection to the controller 18 configured to handle the recognized fingerprint by being accommodated in the body 100. Hence, the recognition module 14c may be disposed in the first connector 300, and more particularly, at the first end portion 100a of the body 100 or may be disposed adjacent to the first connector 300, and more particularly, to the first end portion 100a of the body 100, in order to be located adjacent to the first terminal 16a. Moreover, as the recognition module 14c needs to directly come in contact with a finger of a user for the fingerprint recognition, it may be necessary for the recognition module 14c to be partially exposed out of the device 10. Hence, the recognition module 14c may be stacked on the first terminal 16a in the first connector 300 and may be also exposed partially out of the device 10, and more particularly, out of the case 110 of the body 100 for the fingerprint recognition. Thus, by disposing the parts having relatively large volumes in a prescribed portion of the device 10, and more particularly, on the first end portion 100a, the large parts can be optimally disposed in the device 10. Hence, an overall size of the device 10 can be maintained compact, whereby the exterior of the device 10 can be further enhanced.

Moreover, in order for the device 10 (i.e., the body 100) to become compact despite stacking the large-sized recognition module 14c and the large-sized first terminal 16a, it is necessary for the first end portion 100a of the body 100 to be designed in further detail. In particular, referring to FIG. 7, since the recognition module 14c is a sensitive part, a spacer 131 may be inserted between the first terminal 16a and the recognition module 14c for electrical insulation. Moreover, the first end portion 100a may include a bracket 133 located below the first terminal 16a in order to fix a circuit board 132 for a power connection to the circuit board 13 by the first terminal 16a to the first terminal 16a. In the assembly having a multitude of parts stacked therein, the rest of a multitude of the parts other than the recognition module 14c and the first terminal 16a are also indispensable mostly. And, each of the rest of the parts has a thickness required to the minimum. Hence, in order to enable the first end portion 100 or the body 100 to be designed thin, a thickness sum of the recognition module 14c and the first terminal 16a may be limited to a prescribed rate over the body 100, and more particularly, over a thickness T of the first end portion 100a. In particular, considering minimum thicknesses of other parts stacked together, the thickness sum of the recognition module 14c and the first terminal 16a may be set to a rate smaller than 70% over the total thickness of the body 100 (e.g., the first end portion 100a) shown in FIG. 7. For instance, when the thickness T of the body 100 is 6 mm, thicknesses of the recognition module 14c, the spacer 131, the first terminal 16a, the circuit board 132, the bracket 133 and the decoration member 120 can be designed to 1.2 mm, 0.35 mm, 2.45 mm, 0.4 mm, 0.7 mm and 0.9 mm, respectively. Hence, the thickness sum of the recognition module 14c and the first terminal 16a is 3.65 mm and can be set to a value smaller than 70% of the total thickness Y '6 mm', and more particularly, to about 61%. By limiting the rate of the thickness sum of the recognition module 14c and the first terminal 16a, it is able to design the device 10, and more particularly, the body 100 to become compact in a manner of enabling all other indispensable parts to have proper thicknesses.

When the band 200 is coupled with the body 100 by the first connector 300, the first terminal 16a is not exposed to be protected against water. Yet, if the band 200 is separated by the first connector 300, the first terminal 16a may be externally exposed from the device 10. Hence, in order to protect the first terminal 16a from water when the first connector 300 separates the band 200 from the body 100, an additional waterproof mechanism may be applicable to the first terminal 16a and the periphery of the first terminal 16a. In particular, the first terminal 16a may be covered with a waterproof coating. Such a waterproof coating may be formed by attaching a film of waterproof substance to a surface of the first terminal 16a. For instance, a conformal coating may be applied as the waterproof coating to the first terminal 16a. Moreover, the first terminal 16a and the recognition module 14c may be connected to the circuit board 13 inside the body 100 by an electrical connecting member such as FPCB for example. In particular, referring to FIG. 2 and FIG. 7, the connecting member may be connected to the circuit board 13 through the opening 110d formed in the case 110. Yet, while the first terminal 16a is externally exposed, the water having flown into the first terminal 16a may arrive at the parts inside the body 100 through the opening 110d. Hence, the body 100 may include a gasket 140 inserted between the connecting member and an outer circumference of the opening 110d. Although the gasket 140 allows the connecting member to pass through, it can seal the rest portions of the opening 110d. The gasket 140 is made of a slightly deformable material for the perfect seal-off and may be formed of LSR (liquid silicon rubber) for example. The above-described waterproof mechanism protects the first terminal 16a and the periphery of the first terminal 16a against water, thereby preventing the device 10 from malfunctioning due to water.

Figure 10:
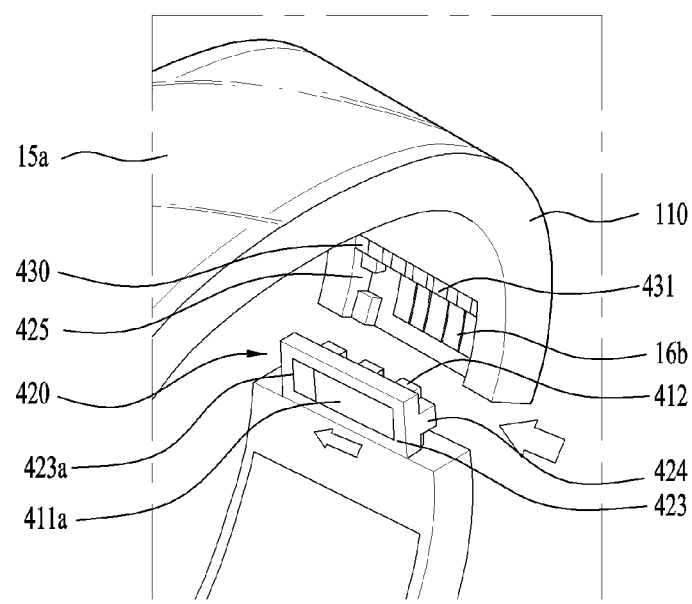
FIG. 10 is a partial perspective diagram to illustrate a second connector of a wearable smart device.
Figure 11:
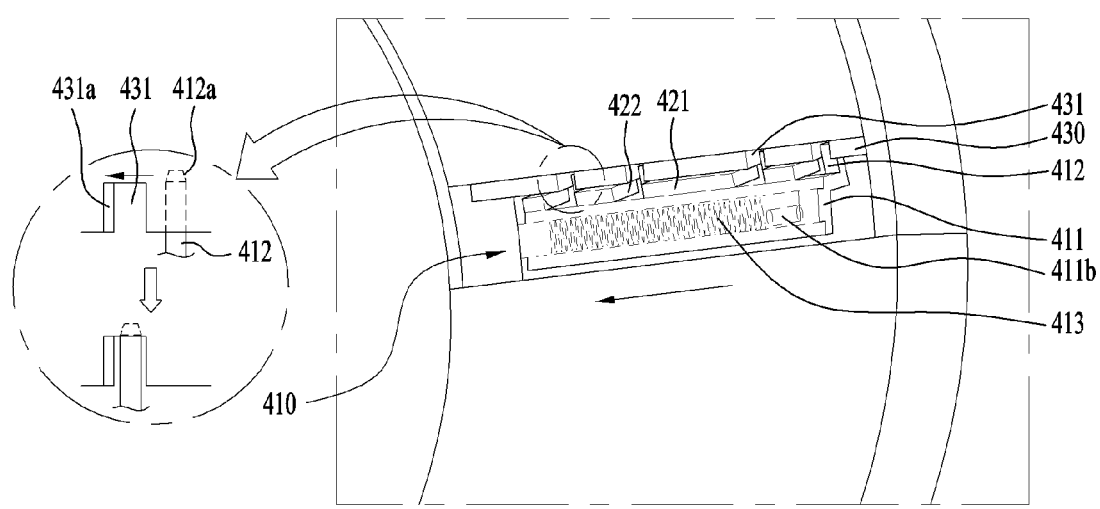
FIG. 11 is a partial perspective diagram of a latch of a second connector and a structure disposed around the latch and a partially enlarged diagram to illustrate locking and unlocking according to a movement of the latch.
Figure 12:
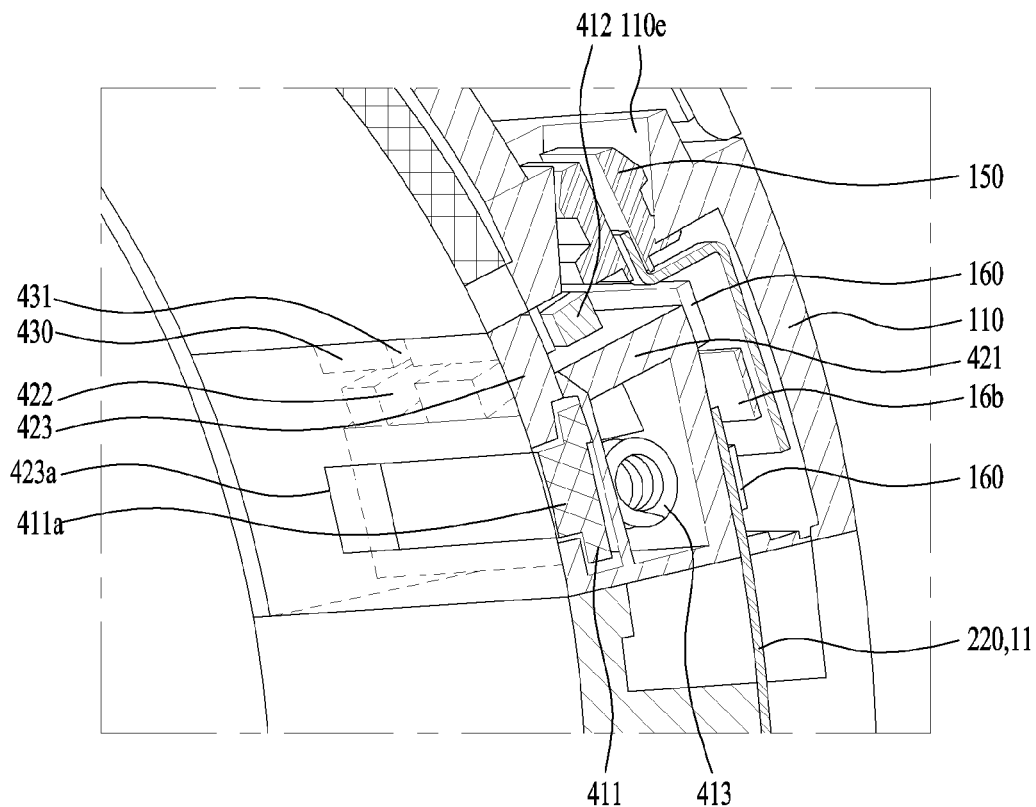
FIG. 12 is a partial cross-sectional diagram to illustrate a second connector of a wearable smart device in detail.
Figure 13:
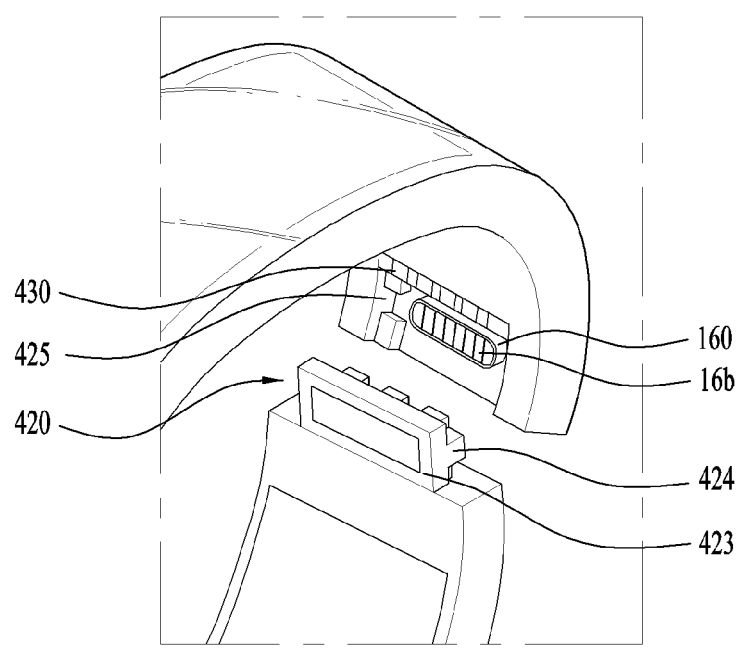
FIG. 13 is a partial perspective diagram to illustrate a second terminal of a body of a wearable smart device and a waterproofing structure thereof.

With reference to the related drawings, the structure of the second connector 400 is described in detail as follows. FIG. 10 is a partial perspective diagram to illustrate a second connector of a wearable smart device. FIG. 11 is a partial perspective diagram of a latch of a second connector and a structure disposed around the latch and a partially enlarged diagram to illustrate locking and unlocking according to a movement of the latch. FIG. 12 is a partial cross-sectional diagram to illustrate a second connector of a wearable smart device in detail. And, FIG. 13 is a partial perspective diagram to illustrate a second terminal of a body of a wearable smart device and a waterproofing structure thereof. For the better understanding, FIG. 2, FIG. 3 and FIG. 9 are referred to in the following description as well.

First of all, the band 200 includes the battery 19a. And, the battery 19a can supply a power to the body 100 using the connecting module 220. If the band 200 is separated from the body 100 by both of the first connector 300 and the second connector 400, the battery 19a is separated from the body 100 as well, whereby the supply of the power may be completely interrupted. While the supply of the power is interrupted, the device 10 is completely shut down, thereby being unable to provide the functions of a smart device. For instance, the device 10 is unable to display a time and is also unable to receive a message or an incoming phone call. Moreover, when the band 200 is installed, the device 100 should be rebooted. Hence, it may take a considerable time until a normal operation becomes available. The complete separation of the band 200 and the interruption of the power supply due to the band separation may cause inconvenience to a user. Meanwhile, a user does not replace the band 200 frequently despite wearing or removing the device 10 frequently. Although it is unable to avoid the complete separation of the band 100 and the interruption of power, it is necessary for the supply of the power to continue in order to prevent inconvenience from being caused to a user on wearing or removing the device 10 frequently. In particular, at least one of the connectors 300 and 400 needs to maintain the coupling between the body 100 and the band 200 for the supply of power from the battery 19a. As mentioned in the foregoing description, the wearing and removal may require the separation of the band 200 from one connector only. Substantially, when the device 10 is worn or removed, the first connector 300 separates the band 200, whereas the second connector 400 can maintain the coupling between the body 100 and the band 200. In particular, not only for the convenient wearing and removal but for the power maintenance, when the device 10 is worn or removed, the coupling between the body 100 and the band 200 in the second connector 400 should be maintained. Hence, in order to maintain the power on wearing or removing the device 10, the second connector 400 can be configured to supply the power to the body 100.

In particular, referring to FIG. 10, FIG. 12 and FIG. 13, the device 10 can include a second terminal 16b electrically connected as the interface unit 16 to the battery 19a to supply the power to the body 100. In order to maintain the power supply during the wearing and removal, the second terminal 16b may be disposed in or near the second connector 400. Moreover, since the second terminal 16b is configured to supply power to the parts within the body 100, the second terminal 16b may be disposed at/near the body 100, and more particularly, at/near the second end portion 100b of the body 100 for the facilitation of the connections to the corresponding parts. Furthermore, the second terminal 16b may be exposed from the second end portion 100b to facilitate the connection to the battery 19b of the band 200, and more particularly, to the connecting module 220, thereby opposing the second end portion 200b of the band 200. Hence, the body 100 may include the second terminal 16b disposed at/near the second connector 400 or the second end portion 100b of the body 100. Referring to FIG. 12, the connecting module 220 connected to the battery 19a extends to the second end portion 200b of the band 200. If the body 100 and the band 200 are coupled together at the second connector 400, the connecting module 220 can be coupled with the second terminal 16b exposed externally from the first end portion 100b of the body 100. On the other hand, if the second connector 400 separates the band 200 from the body 100, the second terminal 16b and the body 100 are electrically disconnected from the connecting module 20 and the battery 19a and the second terminal 16 can be externally exposed from the device 10. Moreover, when the device 10 is worn or removed, the first terminal 16a is externally exposed (due to the separation of the band 200 in the first connector 300), whereas the second terminal 16b can be connected to the battery 19a through the connecting module 220 in the second connector 400. Hence, referring to FIG. 6 and FIG. 7, if the charging cable P is connected to the first terminal 16a, the supplied power can be supplied to the battery 19a via the first terminal 16a and the second terminal 16b. In particular, the first terminal 16a is able to charge the battery 19a as well as to supply the power to the body 100. Moreover, since the battery 19a can be charged using the built-in first terminal 16a, additional cradles may not be required for charging the battery 19a and the battery 19a does not need to be separated for the charging. Hence, a user can use the device 10 more conveniently.

Moreover, if the band 200 is separated from the body 100 by the second connector 400, the second terminal 16b may be externally exposed from the device 10 like the first terminal 16a. Hence, in order to protect the second terminal 16b from water, a waterproof mechanism may be applicable to the second terminal 16b and the periphery of the second terminal 16b. In particular, the second terminal 16b may be covered with a waterproof coating in a manner similar to that of the first terminal 16a. For instance, a conformal coating may be applied as the waterproof coating to the second terminal 16b. Moreover, the second terminal 16b may be connected to the circuit board 13 inside the body 100 by an electrical connecting member such as FPCB for example. In particular, referring to FIG. 12, the connecting member may be connected to the circuit board 13 through the opening 110e formed in the case 110. Yet, the external water may arrive at the parts inside the body 100 through the second terminal 16b and the opening 110e. Hence, the body 100 may include a gasket 150 inserted between the connecting member and an outer circumference of the opening 110e to seal the opening 110e. The gasket 150 may be made of a slightly deformable material for the perfect seal-off and may be formed of LSR (liquid silicon rubber) for example. Furthermore, referring to FIG. 12 and FIG. 13, the body 100 may include a waterproof ring 160 provided to the second terminal 16b. The ring 160 may be configured to enclose the second terminal 16b. In particular, the ring 160 can continuously extend along an outer circumference of the second terminal 16b. If the band 200 is coupled with the body 100 in the second connector 400, as well shown in FIG. 12, the ring 160 is inserted between the band 200 and the body 100 and is then able to adhere closely to the band 200 and body 100 by being compressed. Hence, when the body 100 and the band 200 are coupled with each other in the second connector 400, the ring 160 can seal off the second terminal 16b to prevent water from flowing in. Moreover, as the second connector 400 separates the band 200, if the second terminal 16b is exposed, the ring 160 can play a role as a sort of a barrier, thereby being able to prevent the water from flowing into the second terminal 16b to some extent. The above-described waterproof mechanism protects the second terminal 16b and the periphery of the second terminal 16b against water, thereby preventing the device 10 from malfunctioning due to water.

According to functions intended for the device 10, and more particularly, for the band 200, the first connector 300 and the second connector 400 can perform different operations, respectively. For instance, for the wearing and removal of the device 10, only the first connector 300 can separate the band 200 from the body 100. For the replacement of the band 200, both of the first connector 300 and the second connector 400 can separate the band 200 from the body 100. These operations may require user's manipulation on the connectors 300 and 400. Hence, the connectors 300 and 400 can be additionally improved for user's convenience in consideration of manipulations on the connectors 300 and 400. Meanwhile, the connectors 300 and 400 are described in detail in aspect of user's manipulations on the connectors 300 and 400 by mainly referring to FIG. 4, FIG. 9 and FIG. 10 again as follows.

First of all, actions of wearing or removal the device 10 can be frequently performed while using the device 10. In doing so, for the wearing and removal of the device, only the first connector 300 can separate the band 200 from the body 100. Hence, in order for a user to perform an intended function (e.g., device wearing, device removal, band separation, etc.) through a manipulation of a corresponding connector more conveniently, a first direction corresponding to a direction for separating the band 200 from the body 100 in the first connector 300 can be set as a specific direction. In particular, the first direction may become a direction for the band 200 to move when the band 200 is separated from the body 100 in the first connector 300. And, the setting of the first direction can be determined to be convenient for a user. In particular, the device 10 can have a closed ring shape to be basically used as a bangle or bracelet and the band 200 can be coupled with the body 100 in the first connector 300 and the second connector 400. Moreover, if the device 10 is worn on a user's wrist, the body 100 can enclose an upper part of the wrist and the band 200 can enclose a lower part of the wrist. As mentioned in the foregoing description, in order to remove the device 10, only the first connector 300 performs the separation of the band and the second connector 400 can maintain the coupling of the band 300. If the first connector 300 separates the band 300, as well shown in FIG. 4 including the partial enlarged diagram, the band 200 may fall in a gravity direction (i.e., downward) due to its weight by getting distant from the wrist, whereas the body 100 is supported by the wrist. By the coupling maintained in the second connector 400, the band 200, i.e., the second end portion 200b is bound to the body 100 or the second connector 400, whereby a portion of the separated band 200, i.e., the first end portion 200a and peripheries of the first end portion 200a can be separated from the body 100 in a manner of moving in a circumferential direction of the body 100 or the device 10. Moreover, considering the shape of the device 10, when the band 200 is separated in the first connector 300, the first end portion 200a and peripheries of the first end portion 200a can be described as moving in a length direction of the body 100 or the device 10. Hence, if a user separates the band 200 from the body 100 in the first connector 300 according to the movement in the length or circumferential direction and the separation, a gap or clearance enough to withdraw a user's wrist can be directly generated between the body 100 and the band 200. For this reason, since a user does not need to additionally deform the band 200 to form the gap, the user can remove the device 10 more conveniently. Moreover, when a gap is formed by separating the band 200 in the first connector 300 in order to wear the device 10, the band 200 can show the same behavior as mentioned in the former description. In consideration of these advantages, the band 200 can be separated from the body 100 in the circumferential or length direction of the body 100 or the device 10. In particular, the first connector 300 can be configured to separate the band 200 from the body 100 in the circumferential or length direction of the body 100 or the device 10. Eventually, in the device 10 according to one example of the present application, the first direction may become the length direction or the circumferential direction of the body 100 or the wearable smart device 10. Likewise, the band 200 can be coupled with the body 100 in the length direction or the circumferential direction of the body 100 or the device 10. In particular, the first connector 300 can be configured to couple the band 200 with the body 100 in the length direction or the circumferential direction of the body 100 or the device 10.

On the other hand, for the replacement of the band 200, both of the first connector 300 and the second connector 400 can separate the band 200 from the body 100. Yet, unlike the wearing and removal of the device 10, the exchange of the band 200 may not be performed frequently. Hence, a second direction for separating the band 200 from the body 100 in the second connector 400 can consider the wearing and removal of the device 10 in the first place like the first direction. Since the first direction of the first connector 300 has been already set, the second direction can be set as a specific direction in consideration of the first direction. In particular, the second direction can become a direction in which the band 200 moves on being separated from the body 100 and can be set in association with the first direction. In particular, when the first connector 300 separates the band 200 in order to remove the device 10 from a wrist, the second connector 400 may release the coupling of the band 200 due to various reasons, and more particularly, to a user's manipulation mistake. Actually, the first connector 300 and the second connector 400 include a coupling mechanism configured to coupling the band 200 and the body 20 with each other. The band 200 is released from the body 200 in the first place by a user's combining mechanism manipulation and can be then withdrawn from the body 100 to be separated. In case that the band 200 is separated in the second connector 400, the whole band 200 is separated from the body 100 by a manipulation mistake. Hence, a user should couple the band 200 with the body 100 again in the first connector 300 and the second connector 400 in conveniently. Yet, if the band 200 is separated in the second connector in a radial direction, i.e., a direction vertical to a circumferential direction, as well shown in FIG. 9 including a partial enlarged diagram, although the coupling mechanism releases the band 200 from the body 100, the weight of the band 200 works in a downward direction, i.e., in a direction tangential to the circumferential direction. Hence, as the band 200 is not separated from the body 100, it is able to remove the device 10, using the separation of the band 200 in the first connector 300 only, in a manner convenient as intended. Moreover, when a gap is formed by separating the band 200 in the first connector 300 in order to wear the device 10, the band 200 can show the same behavior as mentioned in the foregoing description. Hence, the radial-direction separation of the band 200 raises reliability of the device 10 as well as secures user's convenience. Moreover, the complete separation of the band 200 for the replacement of the band 200 can be conveniently performed by the radial-direction separation of the band 200. In consideration of these advantages, the band 200 can be separated from the body 100 in a radial direction of the body 100 or the device 10. In particular, referring to FIG. 9 and FIG. 10, the band 200 may be separated in an inward radial direction or in an outward radial direction. In particular, the second connector 400 can be configured to separate the band 200 from the body in the radial direction of the body 100 or the device 10. Eventually, in the device 10 according to one example of the present application, the second direction may become the radial direction of the body 100 or the wearable smart device 10. Likewise, the band 200 can be coupled with the body 100 in the second connector 400 in the inward or outward radial direction of the body 100 or the device 10 in order to be opposite to the second direction. In particular, the second connector 400 can be configured to couple the band 200 with the band in the inward or outward radial direction of the body 100 or the device 10 in order to be opposite to the second direction.

Figure 8:
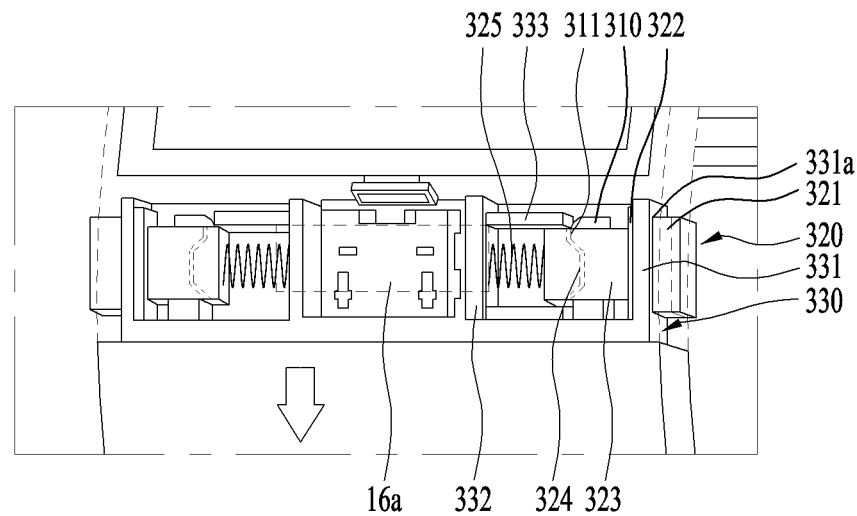
FIG. 8 is a perspective diagram to illustrate a first connector of a wearable smart device.

Meanwhile, the first connector 300 and the second connector 400 can include the first coupling mechanism and the second coupling mechanism, which are configured for the aforementioned separation and coupling of the band 200, respectively. First of all, regarding the first connector 300, the first coupling mechanism is designed to perform the separation of the band 200 in the first direction, which is described in detail with reference to the related drawings in the following. FIG. 8 is a perspective diagram to illustrate a first connector of a wearable smart device. In addition to FIG. 8, FIGS. 4 to 7 related to the first connector 300 can be referred to for the description of the first mechanism.

Referring to FIG. 8, the first connector 300 may include a first latch 310 provided to the band 200. And, the first connector 300 can include a lock member 320 configured to engage with the first latch 310 by being provided to the body 100. The first latch 310 can be installed at the first end portion 200a of the band 200 and may be inserted/withdrawn in/from the body 100 along a length or circumferential direction of the body 100. For the smooth insertion into the body 100, the first latch 310 extends long in the circumferential direction and can be oriented toward the body 100. The first latch 310 can include a member in a bar shape, as shown in FIG. 4 and FIG. 6, and may include a recess 311 to engage with the lock member 320. Although a single latch 310 may perform the intended coupling and separation of the band 200 in the first connector 300, a pair of first latches 310 may be included in the first connector 300 for more stable operations. A pair of the first latches 310 can be disposed at the first end portion 200a of the band 200 in a manner of being spaced apart from each other in a prescribed distance.

The lock member 320 may include a body 323 and a head 321 and may further include a stopper 322 disposed between the body 323 and the head 321. And, the lock member 320 may have a protrusion formed on a backside of the body 323, as denoted by a dotted line in the drawing, to be selectively inserted in the first latch 310. In order for the first latch 310 and the lock member 320 to engage with each other, the protrusion 324 can be inserted in the recess 311 of the first latch 310. The lock member 320, as shown in the drawing, can be oriented in a width direction of the device 10, i.e., the body 100. By such an orientation, the lock member 320 can be oriented in a direction vertical to the first latch 310 in order to engage with the first latch 310 actually. In particular, the lock member 320 may include an elastic member 325 disposed along the width direction of the device 10 or the body 100. Since the elastic member 325 can be restored after deformation, the lock member 320 moves in the width direction and is then able to return to a previous location.

In order to guide the width-directional restorable movement of the locking member 320, the first connector 300 may include a housing 330. The housing 330 may have a container structure configured to accommodate the lock member 320 and is able to substantially form the first end portion 100a of the body 100. The housing 330 has a first sidewall 331 adjacent to a lateral portion of the body 100. And, the first sidewall 331 can include an opening 331a. The head 321 supported by the elastic member 320 is projected out of the housing 330 through the first sidewall 331 of the housing 330, and can be then further projected out of the body 100. The stopper 322 is formed larger than the opening 331a of the first sidewall 100 so as to engage with the first sidewall 100 to restrict the movement of the lock member 320. The housing 330 may include a second sidewall 332 configured oppose the first sidewall 331. And, the elastic member 325 can be supported by the second sidewall 332. The housing 330 can have a guide wall 333 extending in the width direction of the body 100, and the lock member 320 can be guided to move in the width direction by the guide wall 331. Hence, the lock member 320 may engage with or be released from the first latch while performing a restorable movement in the width direction of the body 100. Moreover, the housing 330, as shown in FIG. 5, can include an opening 331a in which the first latch 310 is inserted. In case that a pair of the first latches 310 are provided as shown in the drawing, a pair of the lock members 320 and the housings 30 can be provided likewise.

FIG. 8 shows the body 100 and the band 200 actually coupled with each other by the first coupling mechanism. If the head 321 is pushed, as denoted by an arrow in the drawing, the body 32 and the protrusion 3432 move in the width direction so as to be withdrawn from the recess 311. Hence, the first latch 310 is released from the lock member 320. As the first latch 310 withdraws from the housing 330 in the circumferential direction, the band 200 can be separated from the body 100 in the circumferential direction. On the other hand, if the withdrawn first latch 310 is inserted into the housing 330 again, the first latch 310 engages with the lock member 320 by the insertion of the protrusion 324 into the recess 311. Hence, the band 200 can be coupled with the body 100. According to the former description of the first mechanism, the first latch 310 is described as installed in the band 200 and the lock member 320 is described as installed in the body 100. Alternatively, the first latch 310 and the lock member 320 may be installed in the body 100 and the band 200, respectively. Hence, the first connector can substantially include the first latch 310 provided to one of the band 200 and the body 100 so as to be inserted into the other along the length direction or the circumferential direction of the device 10 and the lock member 320 configured to engage with the first latch 310 by being provided to the other.

On the other hand, regarding the second connector 400, the second coupling mechanism may be designed to perform the separation of the band 200 in the second direction. In the following description, the second coupling mechanism is described in detail with reference to the related drawings. FIG. 11 is a partial perspective diagram of a latch of a second connector and a structure disposed around the latch and a partially enlarged diagram to illustrate locking and unlocking according to a movement of the latch. Particularly, FIG. 11 shows the second coupling mechanism from which a second body 423 of a housing 420 is removed to clearly represent the inner structure of the second coupling mechanism. FIG. 9, FIG. 10 and FIG. 12 related to the second connector 400 can be referred to for the description of the second coupling mechanism in addition to FIG. 11.

Referring to FIG. 11 and FIG. 12, the second connector 400 may include a second latch 410 provided to the band 200. And, the second connector 400 may include a flange 430 configured to engage with the second latch 410 by being provided to the body 100. The second latch 410 may be installed at the second end portion 200b of the band 200 and may be inserted in or withdrawn from the body 100 along a radial direction of the body 100. The flange 430 may consist of a portion of the case 110 substantially failing to move by being integrally formed with the body 100. The flange 430 extends along the length or circumferential direction of the body 100 and also extends in the width direction. The flange 430 has a multitude of notches 431 spaced apart from each other in a prescribed distance. And, the second latch 420 can be inserted in or withdrawn from the notch 431.

The second latch 410 may include a body 411 and a protrusion 412 provided to the body 411. The body 411 may include a member in a bar shape oriented by extending in the width direction of the device 10, i.e., the band 200. Moreover, the body 411 can include a head 411a exposed output of the device 10, i.e., the band 200 to enable the second latch 410 to be manipulated by a user. Although the head 411a may be exposed from the inner circumference of the device 10, i.e., the band 200, as shown in the drawing, it may be exposed from the outer circumference of the device 10, i.e., the band 200. The protrusion 412 may extend in the length direction or the circumferential direction of the device 10, i.e., the band 200. Moreover, the protrusion 412, as shown in FIG. 11, can include an inclined plane 412a to be smoothly inserted in the notch 431 of the flange 430. The second latch 410 can include an elastic member 413 disposed along the width direction of the device 10 or the band 200. The body 411 may include a member 411b configured to couple the elastic member 412 and the second latch 410 with each other. Since the elastic member 413 can be restored after deformation, the second latch moves in the width direction and is then able to return to a previous location using the elastic member 413.

In order to guide the restorable width-directional movement of the second latch 410, the second connector 400 may include a housing 420. In particular, the housing 420 can have a container structure configured to accommodate the second latch 410 and can substantially form the second end portion 200b of the band 200. In more particular, as well shown in FIG. 10 and FIG. 12, the housing 420 can include a first body 421 and a second body 423 configured to enclose the second latch 410 overall. The first body 421 is disposed to oppose the body 100, and the second body 423 may be disposed to form the inner circumference of the band 200. The first body 421 may include both sidewalls, and one of the sidewalls can support the elastic member 413 that can be deformed for the width-directional movement and restoration of the second latch 410. The first body 421 may include an opening 422. The protrusion 412 of the second latch 410 is projected out of the housing through the opening 422, and the projected protrusion 412 can engage with the body 100, i.e., the flange 430. In order to allow the width-directional movement of the second latch 410, i.e., the protrusion 412, the opening 422 may be formed larger than the protrusion 412 in the width direction. And, the second body 423 may include an opening 423a. Through the opening 423a, the head 411a may be externally exposed from the housing 420 and can be manipulated for an operation of the second latch 410 by a user. Like the opening 422 of the first body 421, the opening 423a of the second body 423 may be formed larger than the head 411a, thereby allowing the head 411a to move in the width direction. By the first body 421 and the second body 423, the second latch 410 can be guided to move in the width direction. Therefore, the second latch 410 may engage with or be released from the flange 430 while moving or returning in the width direction.

Moreover, the housing 420 may be configured to guide the band 200 to be combined with or separated from the body 100 by moving in a radial direction. In particular, referring to FIG. 10, the second connector 400 may include a rib 424 provided to an outer surface of the housing 420. And, the second connector 400 may include a groove 425 configured to accommodate the rib 424 by being provided to the body 100. The rib 424 may be formed at a lateral portion of the housing 420, i.e., the first body 421. In order to accommodate the rib 424, as shown in the drawing, the groove 425 may be formed at the lateral portion of the body 100 as well. Moreover, the rib 424 may be oriented in a manner of extending in the radial direction of the device 10, i.e., the body 100. Hence, when the band 200 is separated from or coupled with the body 100 in the radial direction, the rib 424 is inserted in or withdrawn from the groove 425, thereby guiding the radial movement of the band 200 for the coupling or separation. As mentioned in the foregoing description, an intended function may be provided by a combination of the single rib 424 and the single groove 425. Yet, for more stable guide, a pair of the ribs 424 and a pair of the grooves 425 may be provided to both lateral portions of the housing 420 and both lateral portions of the body 100, respectively.

FIG. 11 and FIG. 12 show the body 100 and the band 200 actually coupled with each other by the second coupling mechanism. If the head 411a is pushed in the width direction, as denoted by an arrow in the drawing, the body 411 and the protrusion 412 can move in the width direction of the device 10 by deforming the elastic member 413. By such a movement, as shown in the partial enlarged diagram shown in FIG. 11, the protrusion 412 may be aligned with the notch 431 of the flange 430. Thereafter, the band 200 can move in the radial direction of the device 10, and more specifically, in an inward radial direction in the drawing by being guided by the rib 424 and the groove 425 and the protrusion can be withdrawn through the aligned notch 431. Thus, the second latch 410 can be released from the flange 430. Subsequently, as the band 200 is withdrawn in the radial direction of the device 10, the band 200 can be separated in the radial direction from the body 100.

On the other hand, if the withdrawn band 200 is inserted in the body 100, it can move in the radial direction of the device 10, and more specifically, in the outer radial direction in the drawing by being guided by the rib 424 and the groove 425 again. Moreover, the protrusion 412, and more specifically, the inclined plane 412a of the protrusion 412 may come in contact with the sidewall of the notch 431. Thereafter, while the band 200 is further moved by a user's push, as the inclined plane 412a is guided by the sidewall 431a, the protrusion 412 can be gradually inserted into the notch 431. Simultaneously, by the slope of the inclined place 412a, the second latch 410, i.e., the body 411 and the protrusion 412 can move in the radial direction while compressing the elastic member 413. On the other hand, unlike such a forced insertion of the protrusion 412, the head 411a is pushed in the width direction to align the protrusion 412 with the notch 431 and may be then inserted into the notch 412. If the protrusion 412 is fully inserted into the notch 431, the second latch 410, and more particularly, the protrusion 412 can return to a previous location by a restoring force of the elastic member 413. Hence, the protrusion 412 engages with the flange 430 and the band 200 can be coupled with the body 100. According to the description of the second coupling mechanism, the second latch 410 is described as installed in the band 200. Yet, the second latch 410 can be installed in the body 100 with the same structure. Hence, the second connector 400 may include the second latch 410 provided to one of the band 200 and the body 100 so as to be inserted in the other in the radial direction of the device 10. And, the second latch 410 may be configured to engage with the other one of the band 200 and the body 100 by moving in the width direction of the device 10.

Both of the first coupling mechanism and the second coupling mechanism mentioned in the foregoing description may need user's direct manipulations. Yet, each of the first coupling mechanism and the second coupling mechanism can automatically couple/separate the band 200 with/from the body 100 by further including an appropriately designed driving mechanism.

The rest of the components of the device 10 can be further improved to provide better functions to a user in addition as well as the aforementioned first and second connectors 300 and 400. Such improved components are described in detail with reference to the related drawings as follows.

Figure 14:
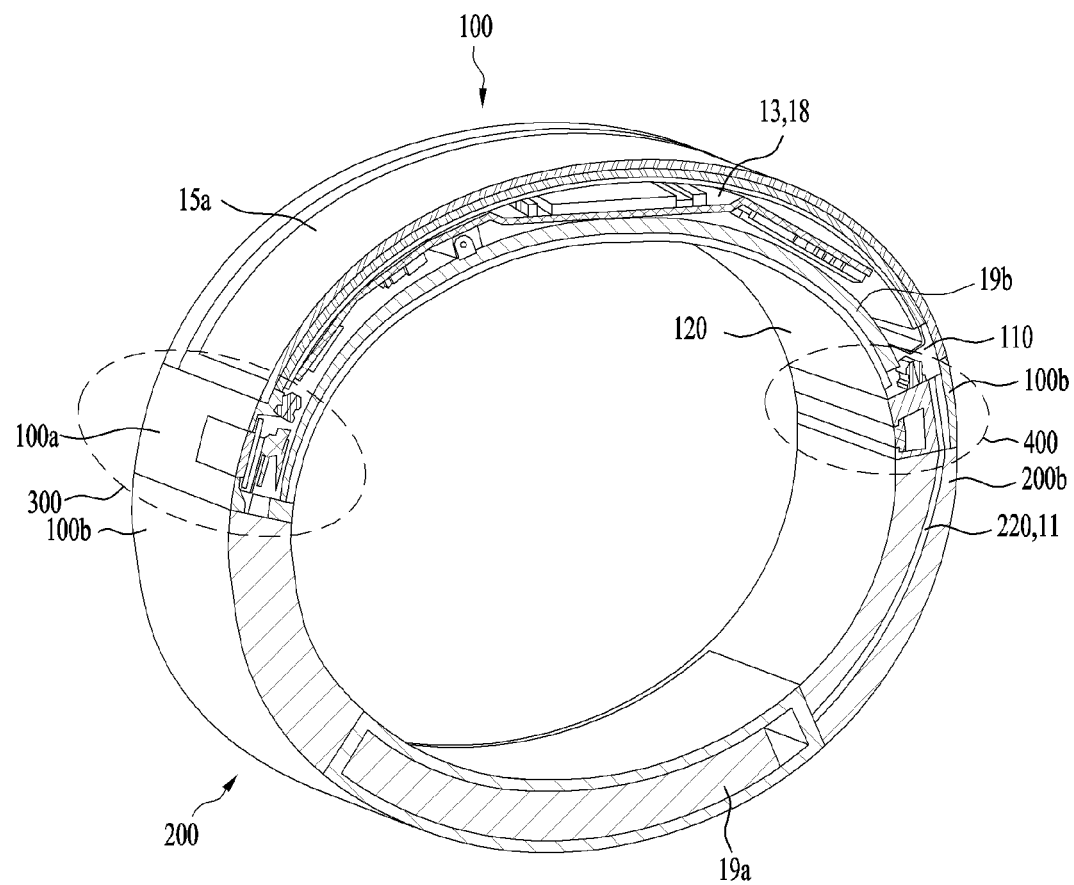
FIG. 14 is a cross-sectional diagram to illustrate one example of a wearable smart device including a supplementary battery.

First of all, while the device 10 is worn or removed, as the first connector 300 separates the band 200 from the body 100, the band 200 is connected to the body through the second connector 400 and the battery 19a of the band 200 can supply a power to the body 100. Yet, while the band 200 is replaced, since the band 200 is separated from both of the first connector 300 and the second connector 400, the supply of the power to the body 100 may be interrupted. As mentioned in the foregoing description, the interruption of the power interrupts functions of the smart device and the device 10 is required to be rebooted, thereby causing inconvenience to a user. Therefore, the body 100, as shown in FIG. 14, may include a supplementary battery 19b configured to supply power to other parts including the display unit 15a. FIG. 14 is a cross-sectional diagram to illustrate one example of a wearable smart device including a supplementary battery.

In particular, referring to FIG. 14, the supplementary battery 19b has a prescribed curvature to be installable in the curved body 100. Moreover, since the display unit 15a and the circuit board 13 are disposed adjacent to the outer circumference of the body 100, the supplementary battery 19b may be disposed adjacent to the inner circumference of the body 100 to avoid interferences with the display unit 15a and the circuit board 13. Moreover, in comparison with FIG. 3, a portion of the inner circumference of the case 110 is removed and the supplementary battery 19b may be installed instead of the removed portion. Hence, although the supplementary battery 19b is additionally included, the thickness of the body 100 may not increase. On the other hand, the supplementary battery 19b may be added inside the body 100 without removing the inner circumference of the case 110. By the above-configured supplementary battery 19b, when the band 200 is replaced (i.e., although the supply of the power by the battery 19a is interrupted), a power can keep being supplied to the body 100 and a user can use the device 10 more conveniently.

Figure 15:
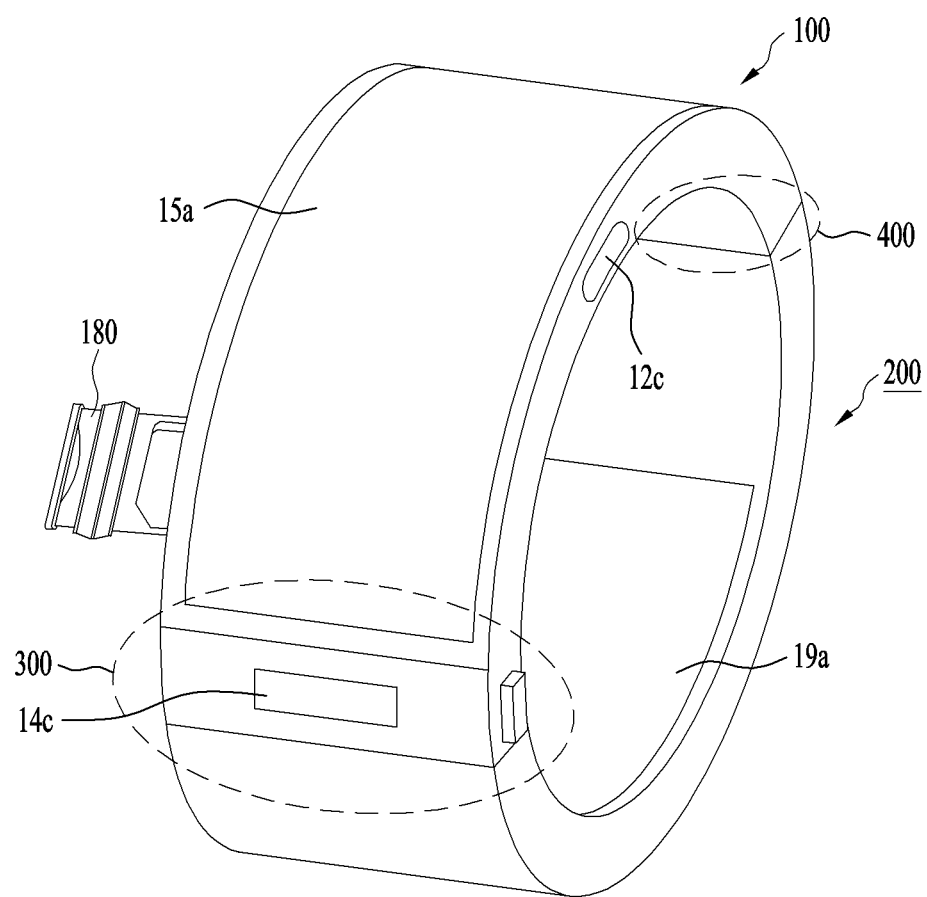
FIG. 15 is a perspective diagram to illustrate one example of a wearable smart device including an SIM tray.

Moreover, since the device 10 has the wireless communication unit 11, it is able to function as an independent mobile terminal. In this case, a mobile terminal should have a unique ID for being distinguished from other terminals to prevent crosstalk of lines. To this end, SIM (subscriber identity module) card may be required. Hence, referring to FIG. 15, the device 10, i.e., the body 100 may include a tray 180 configured to accommodate the SIM card. The tray 180 may be slidably installed in the body 100. The tray 180 may be externally withdrawn from the body 100. The SIM card is loaded on the withdrawn tray 180. And, the SIM card loaded tray 180 can be inserted in the body 100 again to install the SIM card. By the tray 180, a user can use the device 10 more conveniently.

Figure 16:
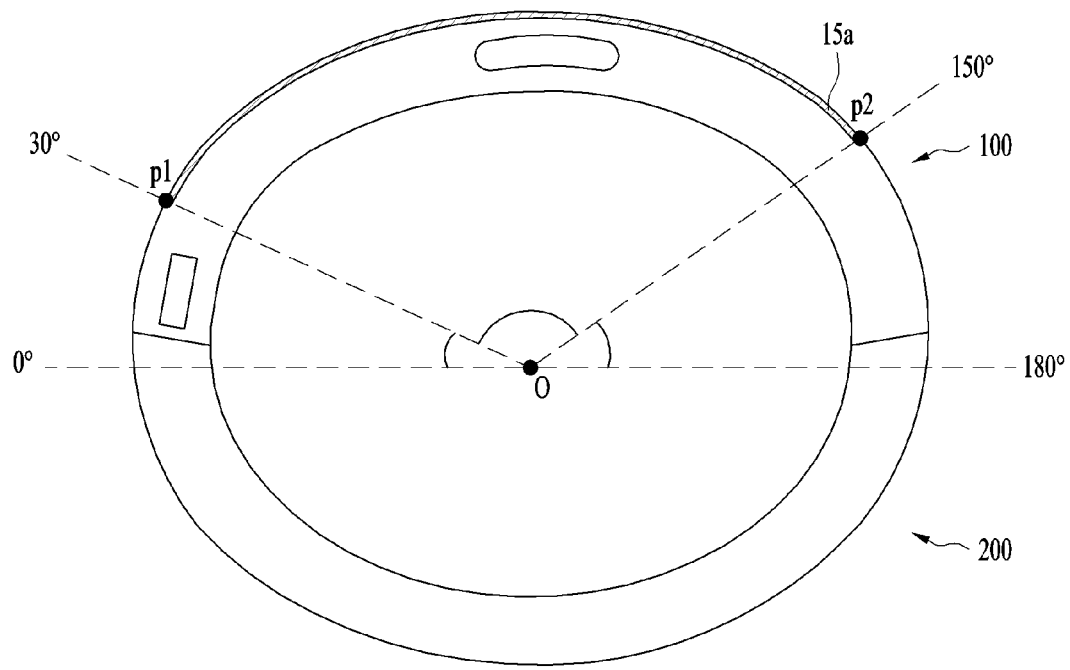
FIG. 16 is a diagram of a lateral view to illustrate a display unit formed range of a wearable smart device.
Figure 17:
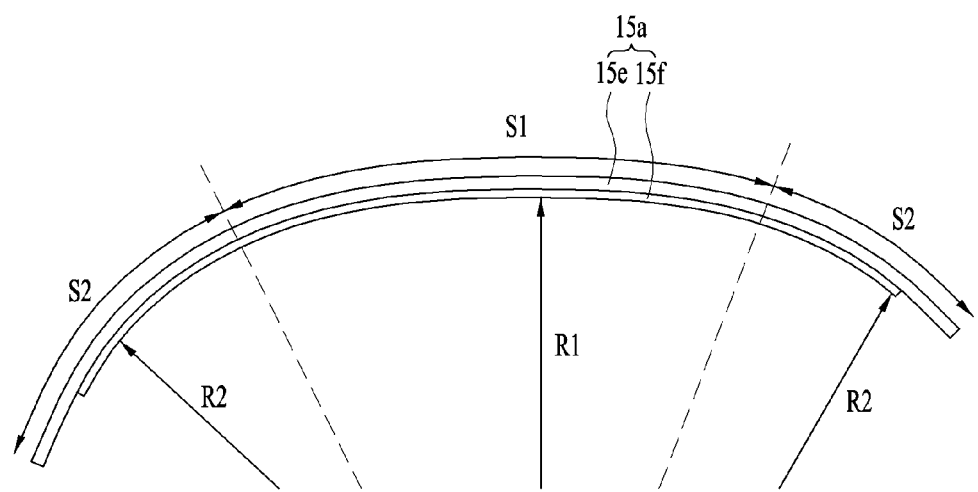
FIG. 17 is a schematic diagram to illustrate curvatures of a display unit of a wearable smart device.

Meanwhile, the display unit 15a is configured to provide visual information to a user. Since the display unit 15a has a considerable size and disposed on the outer circumference of the device 10, it may considerably affect the exterior of the device 10 as an accessory. Hence, it is necessary to design the display unit 15a in consideration of functions as a smart device and accessory. FIG. 16 is a diagram of a lateral view to illustrate a display unit formed range of a wearable smart device, and FIG. 17 is a schematic diagram to illustrate curvatures of a display unit of a wearable smart device. The display unit 15a optimized for the intended functions is described in detail with reference to the drawings as follows.

First of all, in order to enable a single screen to show a lot of information, the display unit 15a may be formed as large as possible. Yet, when the device 10 is worn on a wrist, since a view angle of a user is limited, a prescribed portion of the large-size display unit 15a may not be shown to the user. Hence, it is necessary to design a size of the display unit 15a in consideration of an environment in which a user uses the device 10. Actually, in most cases, a user may use the device 10 while doing various works on a table by sitting on a chair. In particular, while the user sits on the chair and places his arms on the table, the user can watch the display unit 15a of the device 10 worn on the user's wrist. In such an environment, in order to determine a size (i.e., range) of the display unit 15a, FIG. 16 shows the device 10 worn on a wrist viewed from a user's first side. Moreover, since the device 10 has a shape of a closed ring overall, the range of the display unit 15a may be set with reference to a center (O) of the ring shape. In particular, once the user's wrist is placed on the table, portions actually adjacent to both lateral portions of the wrist, i.e., the portions adjacent to the center angles 0° and 180° may be well shown to the user. Instead, both lateral portions of the wrist, i.e., points corresponding to center angles 30° from points center angles 0° and 180°, i.e., points P1 and P2 corresponding to center angles 30° and 150° may be included in the user's view angle. Namely, an area between the center angles 30° and 150° may be shown well to the user. Hence, the display unit 15a may be formed from a prescribed point P1 of the body forming the center angle 30° against a prescribed lateral portion of the wrist, on which the device 10 is worn by the user, to another point P2 of the body forming the center angle 150° against the lateral portion.

Moreover, a curvature of a user's wrist is not uniform. In particular, both lateral portions of the user's wrist have big curvatures, while an upper part of the user's wrist may have a relatively small curvature or be flat overall. Hence, it may be necessary to design the display unit 15a in consideration of the curvature of the user's wrist. In particular, the display unit 15a may include lateral portions S2 adjacent to both lateral portions of the wrist, on which the device 10 is worn by the user, and a center portion S1 disposed between the lateral portions S2. According to the aforementioned different curvatures of the corresponding portions of the user's wrist, the curvatures and curvature radiuses R2 of the lateral portions S2 may be set different from the curvature and curvature radius R1 of the center portion S1. Moreover, the upper part of the user's wrist is relatively larger than the lateral portion and may be flat. Generally, a flat display unit can provide a screen quality better than that of a curved display unit. Hence, if the center portion S1 corresponding to the upper part of the wrist is formed flat or to have a small curvature, the display unit 15a may be able to secure a wide area capable of providing a better screen quality together with an improved exterior formed according to the curvature of the wrist. For such reasons, the curvature of the center portion S1 can be formed greater than those of the lateral portions S2 at least, and the center portion S1 may be formed flat. Moreover, since a curvature is inverse proportional to a curvature radius, the curvature radius R1 of the center portion s1 may be set greater than those R2 of the lateral portions S2.

Figure 18:
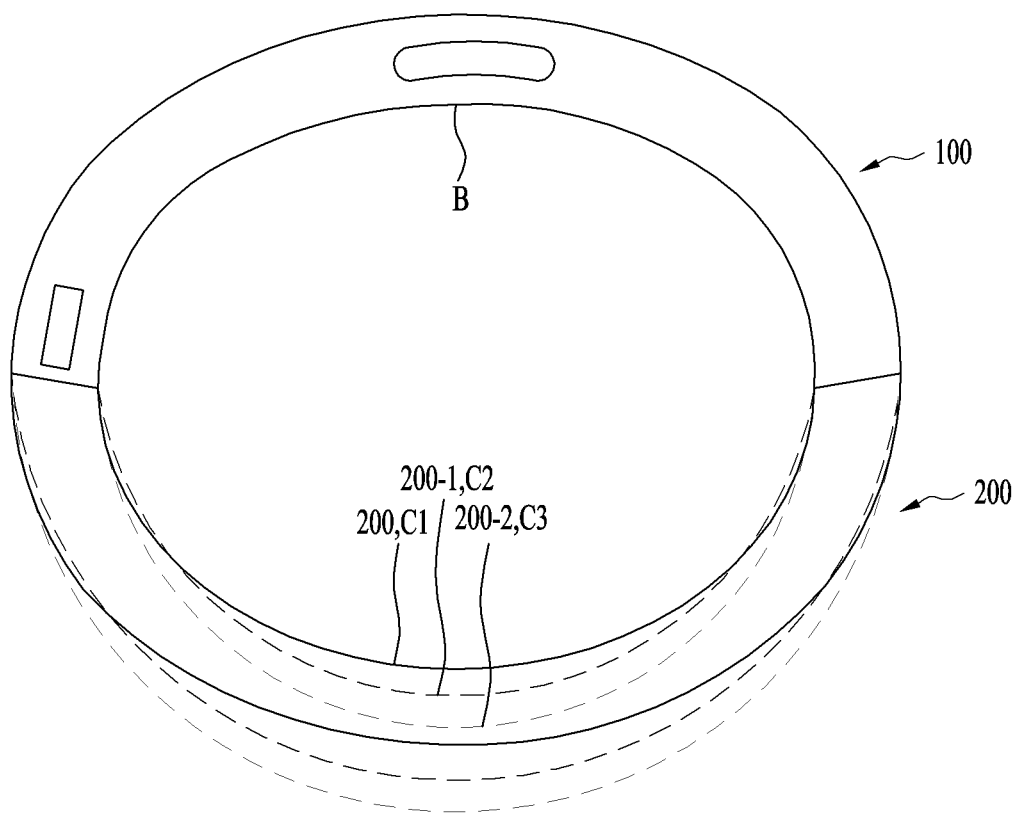
FIG. 18 is a diagram of a lateral view to illustrate replaceable bands of a wearable smart device.

As mentioned in the foregoing description, the band 200 can be completely separated by being separated from the body 100 in both of the first connector 300 and the second connector 400, and can be replaced by a different band 200-1 or 200-2, as shown in FIG. 18. Each of the different bands 200-1 and 200-2 may have a size different from that of the band 200, and a size of the device 10 can be adjusted by the replacement of the band 200. In particular, the band 200 can be replaced by the different band 200-1 or 200-2, which are replaceable with each other, in different size to fit a size of a user's wrist. In particular, the body 100 can be coupled with one of the replaceable bands 200, 200-1 and 200-2 in different sizes to fit the size of the user's wrist. Eventually, the device 10 can include a multitude of the bands 200, 200-1 and 200-2, which are interchangeable with each other, in different sizes to fit a size of a user's wrist.

Moreover, since the size of the user's wrist actually corresponds to a length of the inner circumference of the device 10, i.e., an inner circumference length, an adjustment of a size of the device 10 can be achieved by an adjustment of the inner circumference length actually. IN particular, the body 100 has a fixed inner circumference length B, while the bands 200, 200-1 and 200-2 may have different circumference lengths C1, C2 and C3. In particular, the body 100 can be coupled with one of the bands 200, 200-1 and 200-2 having the different circumference lengths C1, C2 and C3. For instance, the inner circumference length B of the body 100 is 80 mm, and the circumference lengths C1, C2 and C3 of the bands 200, 200-1 and 200-2 are 84 mm, 74 mm and 64 mm, respectively. Such an interchangeable band 200 enables the device 10 to have an accurate size suitable for a user's wrist unlike a general band having a fastener. Moreover, since there is no attachment like a fastener, the band 200 can have a smooth inner surface. Hence, the device 10 can provide a user with comfortable fit and convenience in wearing.

Although the above examples relate to the replacement of the band 200 for adjusting a size of the device 10, the band 200 may be replaced by another band in order to change color, design, material and the like to meet user's taste. Hence, by the interchangeable or replaceable band 200, the exterior of the device 10 can be improved. Furthermore, owing to the replaceable or interchangeable band 200, auxiliary devices capable of extending functions of the device 10 can be added easily and conveniently, whereby more extended functionality can be provided.

Accordingly, the wearable smart device described in the present application provides the following effects or features.

First of all, in order to reduce a size of a body, various parts are disposed in a band as well and long parts are disposed at optimized locations in the body. Therefore, a wearable smart device can have a compact shape, and more particularly a thin shape (i.e., small thickness). Moreover, since the band is configured interchangeable or replaceable, the band does not include parts (e.g., fastener, etc.) required for a fixed band and can have an exterior of sense of unity with the body instead. For such reasons, the wearable smart device can have a substantially improved exterior.

Secondly, the band is set differently and optimally in accordance with a band separated direction and an intended operation, i.e., a wearing of the wearable smart device and a replacement of the band. Moreover, owing to the replaceable or interchangeable bands, a size of the wearable smart device can be accurately adjusted to fit a user's wrist. Therefore, the user can use the wearable smart device conveniently. Besides, owing to the various additional improvements mentioned in the detailed description, convenience in using the wearable smart device can be considerably enhanced.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wearable smart device comprising:
a display configured to display various information;
a body configured to support the display, the body having a first prescribed curvature;
a band configured to be detachably coupled to the body, the band having a second prescribed curvature, the band having a first end portion and a second end portion opposing the first end portion;
a first connector configured to couple the first end portion of the band to the body, the first connector being configured such that the first end portion of the band is separable from the body; and
a second connector configured to couple the second end portion of the band to the body, the second connector being configured such that the second end portion of the band is separable from the body,
wherein the first end portion of the band is separable from the body in a first direction and the second end portion of the band is separable from the body in a second direction different from the first direction, and
wherein the first connector comprises:
a first latch provided to one of the first end portion of the band and the body, the first latch being inserted in the other one of the first end portion of the band and the body along either a length direction of the wearable smart device or a circumferential direction of the wearable smart device; and
a lock member provided to the other one of the first end portion of the band and the body, the lock member configured to engage with the first latch by being movable in a width direction of the wearable smart device.

2. The wearable smart device of claim 1, wherein the body has a fixed inner circumference length, and
wherein the band is one of a plurality of interchangeable bands having different inner circumference lengths.

3. The wearable smart device of claim 1, wherein the body further comprises a first terminal configured to supply power to the body, the first terminal being disposed adjacent to the first connector.

4. The wearable smart device of claim 3, wherein, when the first end portion of the band is separated from the body, the first terminal is exposed from the body so as to be connectable to an external power source.

5. The wearable smart device of claim 4, wherein the band has a battery configured to supply power to the body, and
wherein the body comprises a second terminal electrically connected to the battery to be supplied with power from the battery, the second terminal being disposed adjacent to the second connector.

6. The wearable smart device of claim 5, wherein the battery is disposed at a center portion of the band, and
wherein the band comprises:
a connecting module configured to connect the battery and the second terminal to each other; and
a communication module configured to communicate with an external device and a network, the communication module being integrally formed with the connecting module.

7. The wearable smart device of claim 5, wherein the battery is connectable to an external power by the first terminal in order to be charged, and
wherein, when the second end portion of the band is separated from the body, the second terminal and the body are electrically disconnected from the battery.

8. The wearable smart device of claim 1, wherein, in order for the wearable smart device to be placed on or removed from a user's body, only the first end portion of the band is separated from the body.

9. The wearable smart device of claim 8, wherein, when the first end portion of the band is separated from the body, the second connector maintains the coupling between the band and the body so as to maintain a supply of power to the body by the battery.

10. The wearable smart device of claim 1, wherein, in order to replace the band by a different band, the first end portion and the second end portion of the band are separated from the body.

11. The wearable smart device of claim 1, wherein, when the wearable smart device is worn on a wrist of a user, the first connector and the second connector are disposed adjacent to lateral portions of the wrist of the user, respectively.

12. The wearable smart device of claim 1, wherein the first direction extends in either a length direction of the body or a circumferential direction of the body.

13. The wearable smart device of claim 1, wherein the second direction extends in either a radial direction of the body or a direction perpendicular to a circumferential direction of the body.

14. The wearable smart device of claim 3, wherein the body further comprises a fingerprint recognition module disposed over the first terminal to be exposed from the body.

15. The wearable smart device of claim 1, the second connector comprising a second latch provided to one of the second end portion of the band and the body, the second latch being inserted in the other one of the second end portion of the band and the body in a radial direction of the wearable smart device, the second latch being configured to engage with the other one of the second end portion of the band and the body by being movable in a width direction of the wearable smart device.

16. The wearable smart device of claim 1, wherein the body further comprises a supplementary battery configured to supply power to the display and other components in the body.

17. The wearable smart device of claim 1, wherein the first prescribed curvature has a center point, and
wherein the display is located at the body between a first point that is 30° from a first end of the body and a second point that is 150° from the first end of the body when measured with respect to the center point.

18. The wearable smart device of claim 1, wherein a radius of curvature of the display at a center portion of the display is different than radii of curvatures of the display at lateral portions of the display.

19. The wearable smart device of claim 18, wherein the radius of curvature of the display at the center portion is greater than the each of the radii of curvatures at the lateral portions of the display.

* * * * *